United States Patent [19]

Cole et al.

[11] Patent Number: 4,993,019
[45] Date of Patent: Feb. 12, 1991

[54] LINE UNIT INTERFACE CIRCUIT

[75] Inventors: Gary B. Cole, Knightdale; Michael J. Gingell, Raleigh; Joseph E. Sutherland, Raleigh; Paul M. Matsumura, Raleigh, all of N.C.

[73] Assignee: Alcatel NA, Hickory, N.C.

[21] Appl. No.: 451,436

[22] Filed: Dec. 15, 1989

[51] Int. Cl.[5] .............................. H04Q 11/04
[52] U.S. Cl. ...................... 370/67; 370/92; 370/85.1
[58] Field of Search ............ 370/58.1, 67, 94.1, 370/95.2, 92, 110.1, 111, 85.1

[56] References Cited

U.S. PATENT DOCUMENTS

| | | | |
|---|---|---|---|
| 4,232,386 | 11/1980 | McDonald et al. | 370/68 |
| 4,245,340 | 1/1981 | Landry | 370/111 |
| 4,455,647 | 7/1984 | Gueldner | 370/58.2 |
| 4,653,043 | 3/1987 | Brady | 370/13 |
| 4,849,972 | 7/1989 | Hackett et al. | 370/110.1 |

Primary Examiner—Douglas W. Olms
Assistant Examiner—Christopher O. Edwards
Attorney, Agent, or Firm—Peter C. Van Der Sluys

[57] ABSTRACT

A line unit interface circuit used on line units in a line shelf of a digital loop carrier provides all of the logic necessary to access two subscriber lines to a line unit interface bus connected to common equipment within the line shelf. Information received from the common equipment includes signaling data, configuration data and provisioning data, which is reconfigured and processed by the line unit interface circuit for controlling the subscriber line channels. Configuration data from the common equipment is decoded to assign time slots on the line unit interface bus to the various channels serviced by the line shelf and to further provide for a timing offset between the transmit and receive strobes provided to each subscriber line circuit. A flywheel circuit is used to prevent erroneous time slot assignment in the event of noise or interference on the line unit interface bus.

46 Claims, 19 Drawing Sheets

| FIG. 6(a) |
| FIG. 6(b) |

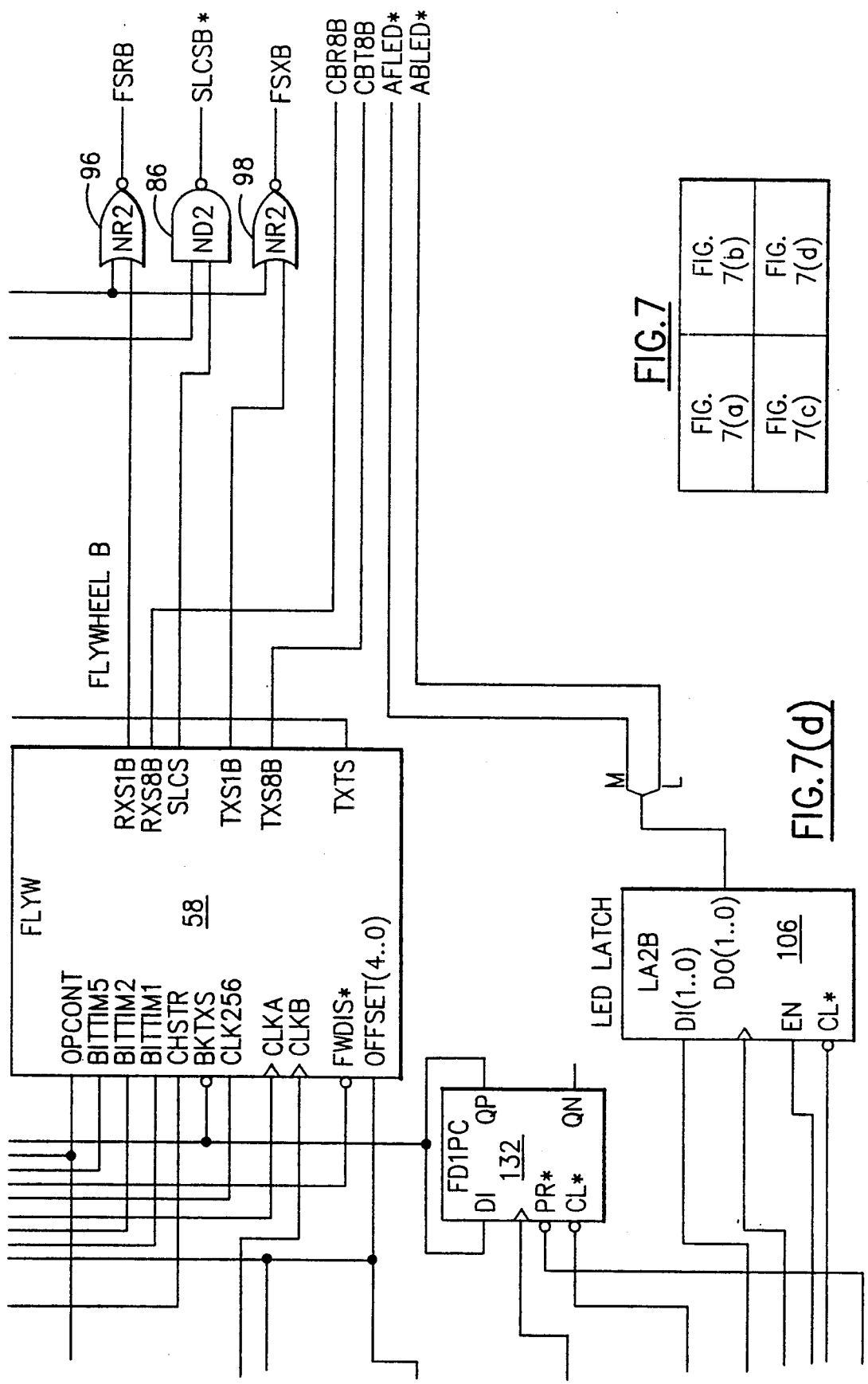

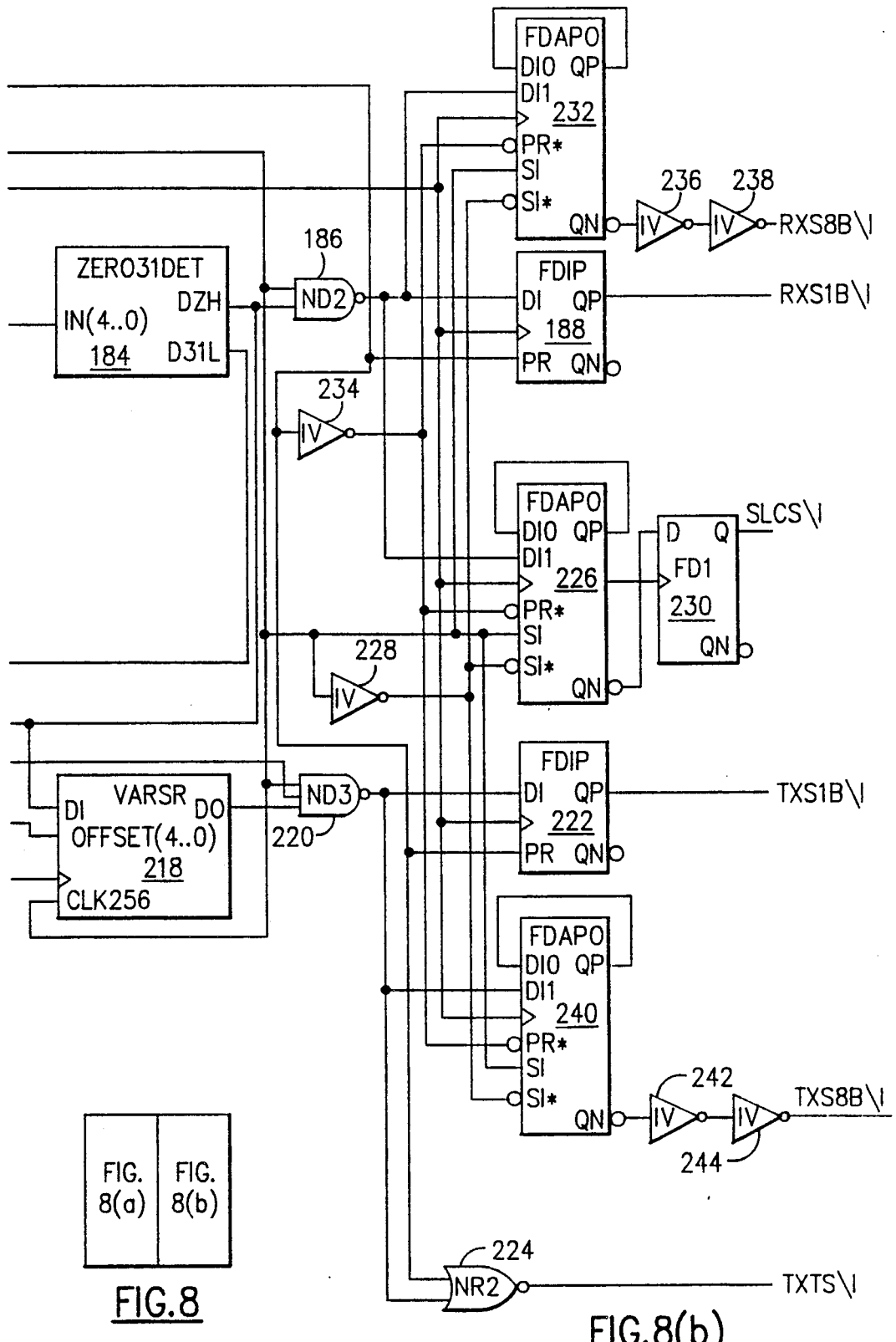

LINE UNIT INTERFACE CIRCUIT

BACKGROUND OF THE INVENTION

1. Field of the Invention

The present invention relates to digital loop carrier (DLC) systems and, more particularly, to a line unit interface circuit for interfacing line units with common equipment in a digital loop carrier line shelf.

2. Description of the Prior Art

The Synchronous Optical Network (SONET) standard (American National Standards Institute Standard T1.105-1988 entitled "Digital Hierarchy Optical Interface Rates and Formats Specification") which is being adopted within the United States and elsewhere defines the standard for the transfer of information by means of optical fiber. According to the SONET standard, an optical carrier level (such as OC1, OC3, OC12 and OC48) signal is a signal that results from an optical conversion of a synchronous transport signal (STS) operating at the same transfer rate. An STS1 level signal is defined as the basic building block signal, with a high-speed transfer rate of 51.840 Mb/s, and is equated to an OCI level optical signal. With high-speed transfer rates there is a need for multiplexing and demultiplexing information associated with lower-speed telephony standards to and from the high-speed transmission lines. Examples of such lower-speed standards include the digital signal standard, or DSX standard (where 'X' is an integer, such as 0, 1, 2 and 3). The DSX standard is commonly used in telephony with DS0 directed to subscriber level signals that operate at 64 Kb/s, DS1 directed to lines operating a 1.544 Mb/s, DS2 operating at 6.312 Mb/s, and DS3 operating at 44.736 Mb/s.

In order to access the high-speed transmission lines, network elements are required for transferring and grooming, i.e., segregating, subscriber information channels between the lower-speed transmission lines and the higher-speed transmission lines. These network elements may take on several different forms for providinq transfer of information between various standard transmission rates. In order to take advantage of the wider bandwidth available on the high-speed lines for various applications such as data transfer, a means was required to combine DS0 channels to provide wider band facilities.

A family of access products has been developed by the Assignee of the present invention. These access products allow slower transmission lines to access the higher-speed optical transmission systems. These access products use an internal multi-link serial bus (SBI) operating at a rate of 4.096 Mb/s to transport information, signalling and processor commands U. S. patent application Ser. No. 351,458 filed May 12, 1989 entitled "Serial Transport Frame Format Method", which is commonly assigned with this application, describes this unique serial bus and is incorporated herein by reference. Two access products are also described in the aforementioned patent application, said access products being a Terminal Multiplexer, adapted to interface a high-speed carrier with DS1 level transmission lines for reception and transmission of high-speed signals in one direction only. An Add/Drop Multiplexer (ADM) is also described in the aforementioned patent application and is designed to interface a high-speed carrier to DSI level transmission lines for reception and transmission in each of two directions.

FIG. 1 illustrates the use of access products in a telephone transmission system. Two high-speed feeder lines 10 and 12 are shown as being at the optical OC1 level and the electrical STS1 level respectively. Both of these feeder lines operate at 51.84 Mb/s. An add/drop multiplexer 14, as described in the aforementioned copending patent application, connects either feeder line 10 or 12 to a DS1 level transmission line 16 operating at 1.544 Mb/s. In order to extract individual DS0 channels from the DS1 line, a separate network element 15 usually referred to as a DLC was required as an interface between the DS0 level and the DS1 level. In a commercial installation several DLCs would be used with each add/drop multiplexer. Thus, two separate network elements 14 and 15 were required in order for individual lines at the DS0 level to access an optical OC1 level transmission line, and in most cases several DLCs were used with one multiplexer.

The need for a DS1 level transmission line between the ADM 14 and the DLC 15 severely limited the control communications that could take place between the two network elements. The use of two separate network elements inherently reduced reliability, since all control information had to be conveyed over a single DS1 line. Control information in the form of signaling could be conveyed only to a limited extent using the robbed bit signaling technique and clear channel communication was not available. A means did not exist for the microprocessors in each element to communicate with each other unless a separate DS0 channel was dedicated to this purpose, removing this particular DS0 channel from the pool of DS0 channels available to carry subscriber traffic.

The DLCs are generally adapted to accept a plurality of line units servicing one or more DS0 channels each. The line units are connected to a TDM bus with the line signals being multiplexed onto the bus at specified time slots, each line unit having predetermined time slots for inserting and extracting data to and from the bus for each of its channels. The line unit would be strobed to be activated during the time slots to which it is assigned. A plurality of back plane connections were required to provide a strobe signal to each line card. Thus, the system was limited to a pre-set number of line cards that could be handled by the system, and the assignment of the time slots to the line cards was fixed.

Control of the system was limited, since the system controller did not have access to the data contained within each time slot, including signaling information pertaining to the time slots.

With the advent of many different types of telecommunications service, various signaling schemes have been devised which are not compatible with each other. Signaling translation between equipment using one signaling scheme and equipment using another signaling scheme was required and the use of special signaling translation circuits for each different type of service had to be developed. Thus, the free interchange of line cards was restricted, due to the need to first provide for the required signaling translation.

Modern telecommunications systems must provide for high-speed wide bandwidth data communications facilities which cannot be serviced by individual DS0 level lines. Thus, higher speed DS1 lines had to be provided to handle individual customer requirements when they exceeded the capability of a DS0 line.

Thus, it was apparent that the flexibility demanded by modern telephone communications systems was not being efficiently handled by the prior art interfaces between high-speed feeder lines and DS0 level subscriber lines. There was clearly a need for a more efficient way of providing access to high-speed transmission lines by individual DS0 subscriber lines.

SUMMARY OF THE INVENTION

The present invention contemplates a circuit for interfacing line units serving one or more subscriber lines with common equipment in a line shelf of a DLC access product and, more particularly, to a circuit for interfacing DS0 subscriber line circuits with a time slot access device (TSA) as described in U.S. patent application Ser. No. 451,419 entitled "Apparatus For Programmably Accessing and Assigning Time Slots In A Time Division Multiplexed Communication System", filed on even date herewith, and assigned to the Assignee hereof, which application is incorporated herein by reference.

U.S. patent application Ser. No. 452,291, entitled "High-Speed Synchronous Transmission Line Access Terminal", filed on even date herewith, and assigned to the Assignee hereof, is incorporated herein by reference. Said patent application describes a single network element which will interface a high-speed feeder transmission line 10 or 12, with a lower speed DS1 line 16 and DS0 subscriber lines 20, as shown in FIG. 1. The network element is an access terminal 22 having a core module 24 connected to either feeder line 10 or 12 and having ports connected to DS1 line 16 and to an access module 26 having ports connected to DS0 lines 20.

The access module 26 may comprise a plurality of individual line shelves, each of which may further accommodate a plurality of line units for connection to individual subscriber lines. Each line shelf may accommodate up to 96 subscriber lines, with the core module 24 accommodating up to seven line shelves, for a total of 672 subscriber lines, each having access to an optical fiber carrier OC1 or an STS1 metallic feeder line.

The core module 24 is connected to the line shelves of the access module 26 by a plurality of SBIs, as disclosed in the aforementioned U.S. patent application Ser. No. 351,458. The SBIs facilitate an embedded control technique for communicating control messages over channel 31, called the VI channel. This embedded control technique is described in U.S. patent application Ser. No. 349,716 filed May 10, 1989, entitled "Embedded Control Technique for Distributed Control Systems", which is commonly assigned with this application and is incorporated herein by reference. The SBI using the VI channel allows the DS0 level signals to be tightly coupled to the high-speed OC1 or STS1 feeder lines. The technique allows for clear channel transmission by eliminating the need for the robbed bit technique and also provides for processor-to-processor communication between modules. The flexibility of the SBI arrangement facilitates signaling processing, provisioning and maintenance functions.

A pair of processors are used in both the core and in the line shelves to provide a host of advantages which will become apparent. One advantage is the unique flexibility provided in grooming DS0 channels and the ability to combine them to provide wider bandwidth capability to service future communications needs such as ISDN. Another advantage of using a line shelf processor (LSP) lies in its adaptability to future enhancements and reconfigurations by merely effecting a software change.

The heart of the line shelf is a line shelf access unit (LSA) which interfaces the line units (LUs) and the SBIs. Each LSA includes a pair of time slot access devices (TSAs) which function to collect and distribute pulse code modulated (PCM) signals, signaling, provisioning and configuration data between the SBIs, the LUs and the LSPs. The TSA provides the LSPs with direct access to the data contained within a particular time slot. This data may contain speech information, signaling and other control information, thereby providing the LSPs with heretofore unavailable control capabilities.

The TSA also facilitates a time slot assignment feature which is controlled by the LSP to provide assignment of any particular time slot to any subscriber line on any LU, or a plurality of time slots to a single subscriber line to provide broad band capability.

The TSA also provides for signaling translation between the signaling scheme used in the particular LUs and the signaling scheme used for signals received on the SBI. The signaling translation function is accomplished via a downloadable translation table, which is written into RAM contained in the TSA unit by the LSP.

The TSA, as previously mentioned, provides a plurality of signals on a line unit interface bus which is connected to the various line units. The line unit interface bus carries two clock lines; eight serial data lines for the transmission and reception of PCM data, signaling, configuration data and provisioning data; and two data lines for transmitting and receiving inventory data stored on the line units.

The line unit interface circuit (LUC) of the present invention performs all of the functions necessary to interface an LU to the common equipment (TSA) via the line unit interface bus. These functions include generation of the necessary framing and timing signals for the line units from two clock signals received from the TSA, the receipt and transmission of signaling and provisioning data, and access to inventory data stored on the line units. A major function of the LUC is to decode configuration data received from the TSA, including offset information, to ascertain the time slots on a TDM transmission line assigned to the subscriber channels serviced by the line units, and to further decode the offset information when a difference between the receive and transmit time slots is required.

When a configuration code received on the line unit interface bus matches a fixed code provided to the LUC by back plane straps connected to identification pins, access to an RX and a TX time slot on the TDM bus is provided. Also provided is a bit-mapped output port decoded from signaling data received on the line unit interface bus to drive various line circuit relays, alarms and indicators. A chip select signal and clock for the inventory storage is also generated.

The LUC also accepts signaling inputs from detector sections of the line unit and encodes these inputs onto a serial signaling output bus on the line unit interface bus and provides framing and sync signals for the line unit codecs servicing each subscriber line.

The decoding circuitry for decoding the configuration data includes a unique flywheel circuit for preventing the erroneous assignment of time slots resulting from noise or false signals received on the line unit interface bus from the TSA. The offset data is provided to a unique variable shift register for controlling the number of time slots between the time a line unit is activated for reception and for transmission.

A primary objective of the present invention is to provide an interface between line units of a line shelf and common equipment of the line shelf.

Another objective of the present invention is to provide for the decoding of time slot assignment codes provided as configuration data.

Another objective of the present invention is to provide a safety feature to prevent the erroneous assignment of time slots due to noise or spurious signals.

Another objective of the present invention is to decode offset data provided with the configuration data to establish a time delay between activation of the line unit for reception and transmission.

Another objective of the present invention is to provide an interface for signaling and provisioning data.

Another objective of the present invention is to detect a chip select bit in the configuration data and to access inventory information stored on the line unit.

DETAILED DESCRIPTION OF THE PRESENT INVENTION

Figure 1:
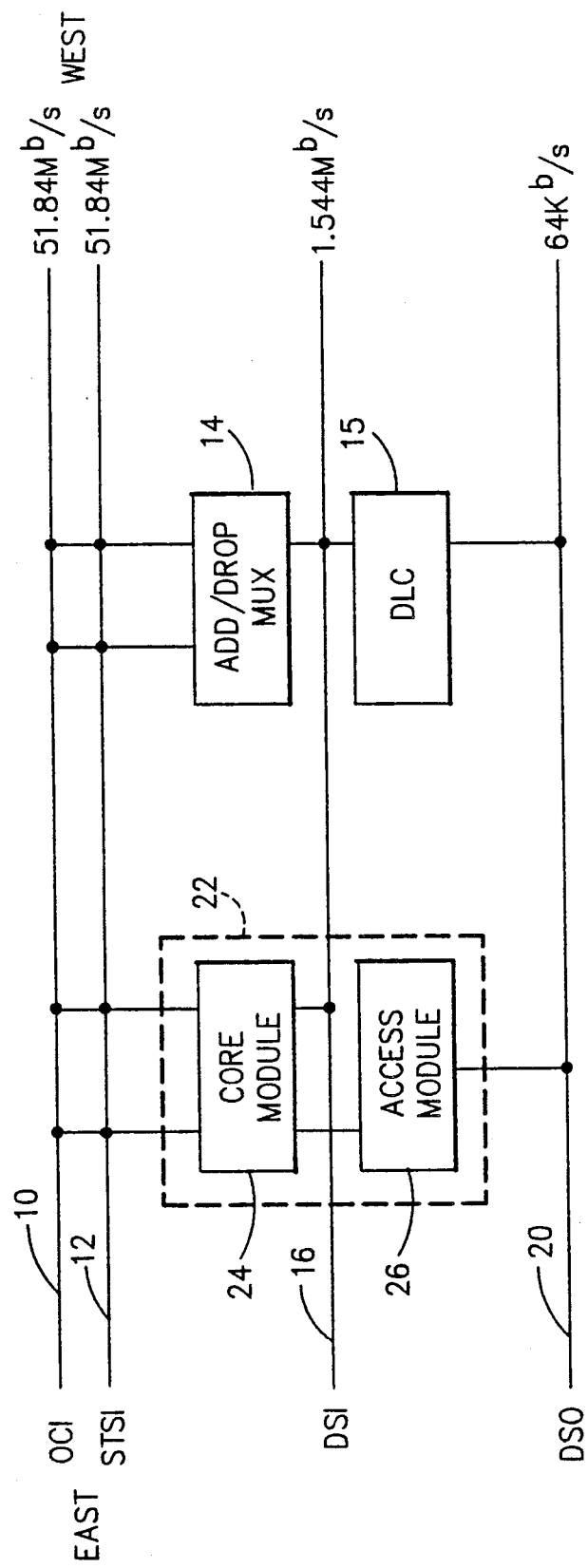
FIG. 1 is a block diagram illustrating the environment in which the present invention is used as compared to that of the prior art.
Figure 2:
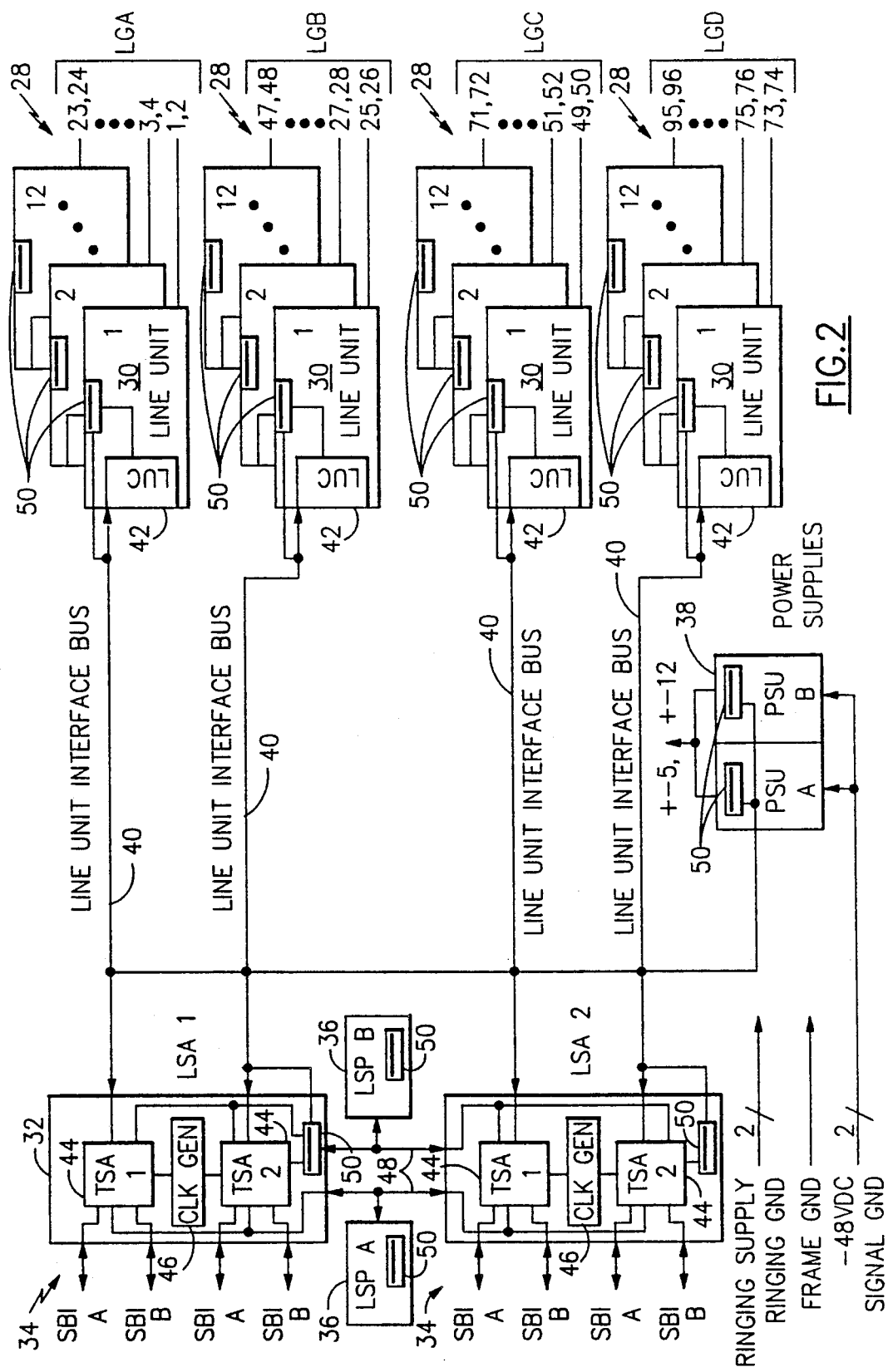
FIG. 2 is a block diagram of a line shelf in which the present invention is used.

Referring to FIG. 2, there is shown a block diagram of a line shelf used in the access module 26. Each line shelf is arranged with four groups 28 of subscriber lines at the DS0 level. Each of the groups includes 12 line units (LUs) 30, most LUs are capable of handling two subscriber lines so that a total of 96 subscriber lines may be handled by a line shelf. A pair of line shelf access units (LSAs) 32 are arranged to each service two of the groups 28 of subscriber lines and function to multiplex the DS0 channels of these groups to a pair of serial interface buses (SBIs) 34, one of which is redundant. Two line shelf processors (LSPs) 36 are provided to control the LSAs 32, with each processor having sufficient capacity to control the entire line shelf in the event of failure of the other processor. Thus, in normal operation both processors work at less than full capacity. In the event of a failure, one processor can service the line shelf with only slightly degraded service. Two power supplies 38 are also provided, with one being redundant.

The LSAs 32 are connected to the various LUs 30 via line unit interface buses 40. The line unit interface buses 40 interface with a line unit interface circuit (LUC) 42 provided in each of the LUs 30. The LUCs 42 perform all the functions necessary to access the line unit interface buses 40 with the LUs 30.

The LUs 30 are plugged into slots in the line shelf, which includes connectors to the line unit interface bus 40. The connectors have five pins that are selectively strapped to provide a five-digit identification code for the slot and the subscriber lines on the plugged-in LU. The LSP periodically scans the various card positions and can detect when a card is plugged into an identified slot.

EEPROMs 50 are provided on each of the pluggable card units, such as the LUs, LSAs, LSPs and power supplies The EEPROMs 50 provide storage for identification and inventory information about each card and other programmable data relating to the circuitry on each card.

The LSAs 32 each include two time slot access circuits (TSAs) 44 and a clock generator 46. The TSAs 44 are connected to each LSP 36 via LSP buses 48 and perform most of the functions of the LSAs 32.

The TSAs 44 perform the following functions in the access terminal 22: reception and transmission of SBI signals; detection and generation of UNICODE and performance of required tasks associated with UNICODE; collection of PCM-formatted information from the LUs and the LSPs; distribution of PCM information to LUs and the LSPs; generation of configuration codes to indicate to the LUs which time slot is available on the various line unit interface buses 40; generation of a coded signal provided in channel 30 of each frame indicating an offset delay between the receive time slot for a subscriber line and the transmit time slot for a subscriber line, which delay is dependent upon delays encountered during initialization of the system; translation of signaling information between the SBIs and the LUs by utilization of RAM-based translation tables provisioned by the LSP; LSP access in both read and write modes to all memory and control registers on the TSA, including access to the time slots of the line unit interface bus and the SBI; reception and transmission of inter-module messages on the VI channel; control of EEPROMs on each plug-in unit; and the provision of storage for information to be transmitted to and received from the various elements connected to the TSA.

Figure 3:
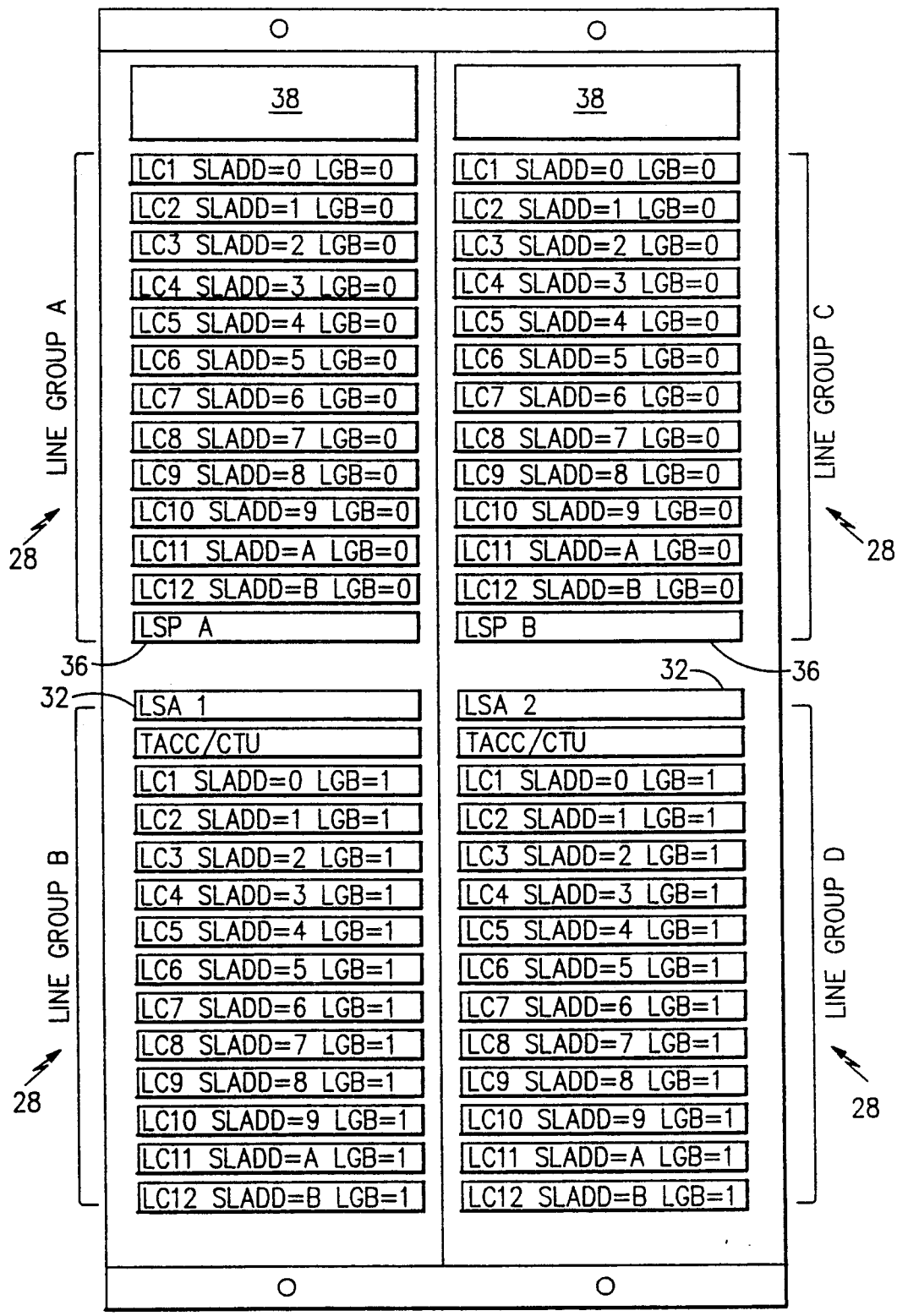
FIG. 3 is an elevational view showing the structural configuration of a line shelf in which the present invention is utilized.

Referring to FIG. 3, there is shown the arrangement of a line shelf having four groups of line units 28, each group consisting of 12 line units serving 24 separate subscriber lines. Each line unit is inserted in a designated slot and is connected to back plane wiring. Line groups A and C on the left side of the line shelf are identified as being associated with a line group 0, while the line units of line groups B and D are on the right side of the shelf and are associated with a line group 1.

For the LSA 32 of FIG. 2 to assign a time slot on a line unit interface bus (LUIB) 40 to a subscriber line, a slot address including the slot number of the line unit 28 serving the subscriber line, the line group bit (LGB) for the slot and the channel A or B bit for the line unit is sent over an RX configuration bus (CONR), a line of the LUIB 40, as a coded configuration word two time slots before the actual time slot to be assigned. This timing allows the LUC 42 enough time to decode the configuration word.

Figure 4:
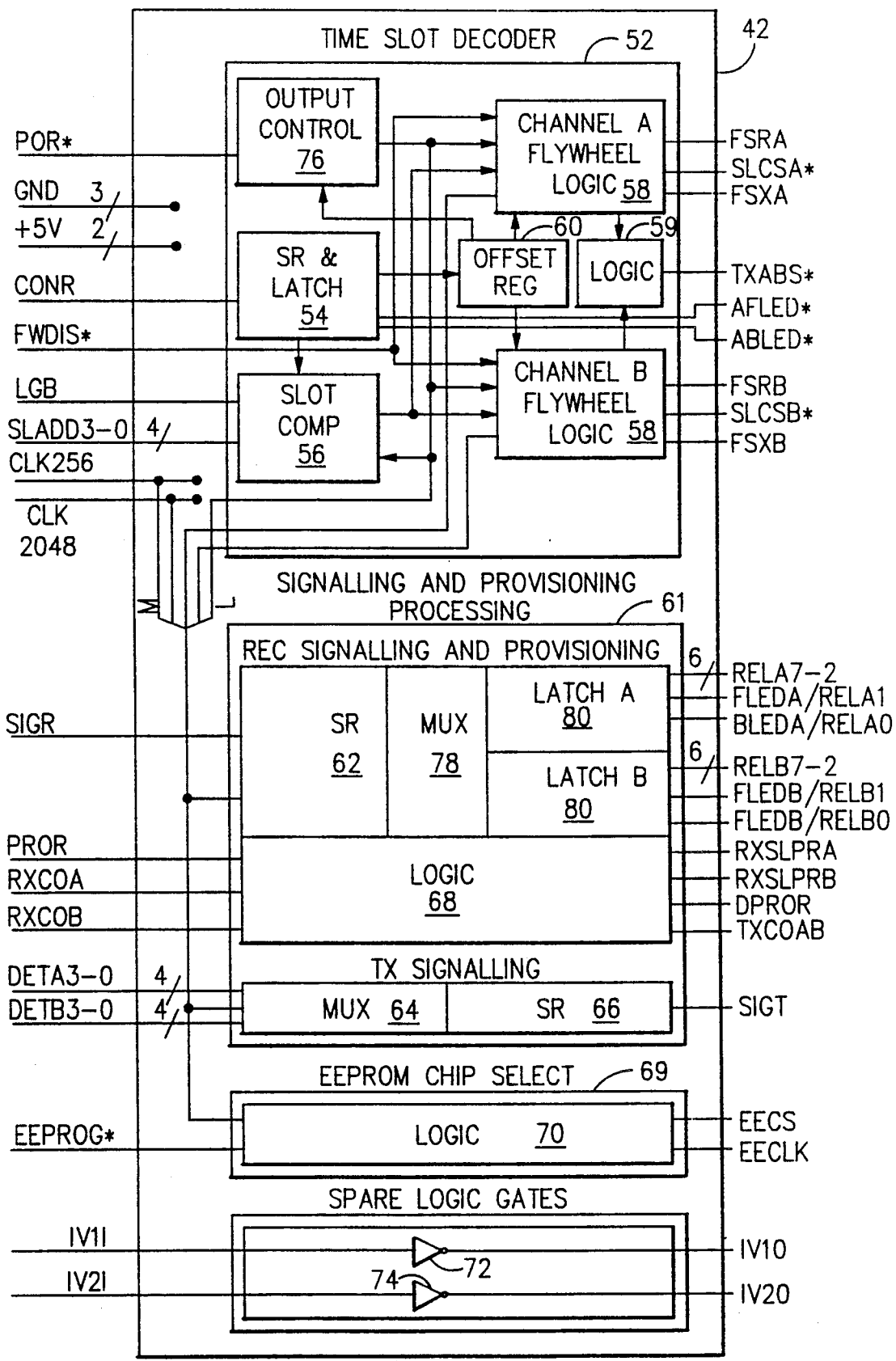
FIG. 4 is a block diagram of the present invention.

Referring to FIG. 4, there is shown a block diagram of the LUC 42. The configuration word from the CONR bus is received and latched in a shift register and latch 54 that is part of a time slot decoder 52. The LUC 42 compares this received slot address to hard-wired slot address pins (SLADD0-3) from the backplane and compares the received LGB bit to the LGB bit from the backplane in a slot comparator 56. Then the LUC determines which line unit channel A or B the time slot is being assigned to, and generates an appropriate timing strobe.

After the CONR data is decoded, the timing strobe is sent to a flywheel circuit 58 for the appropriate line unit channel. This circuit reduces the chance of an intermittent error in the CONR data producing a incorrect activation strobe to activate an inappropriate line unit channel. The flywheel circuit is centered around a 5-bit counter that counts from 0-31, the number of time slots in a frame. It takes two frames of a new strobe address to re-sync the 5-bit counter to a new time slot position. When the counter is in sync, the output will be zero one time slot before the strobes are produced.

The receive and transmit time slots in the TSA chip can have an offset of from 0-31 time slots. This offset is sent as an offset number by the TSA over the CONR line of LUIB 40 in time slot 30. The offset number does not change after it is set by the TSA, unless the TSA re-syncs. An offset register circuit 60 latches the offset number and must receive two offset numbers of equal value for the register to be updated.

Signaling and provisioning data is processed in block 61 which includes sub-blocks for handling received signaling, transmitted signaling and provisioning data. Signaling data (SIGR) is received from the LUIB 40 in serial format and is converted to eight parallel output bits for each channel in a shift register 62 and latches 80.

Transmit signaling is generated by detectors in the line units which provide four detector inputs DETA3-0 and DETB3-0 to the LUC for each channel. These parallel inputs are converted to serial data by a shift register 64 and multiplexer 66 and are gated onto the LUIB 40 by transmit strobes from the time slot decode circuit 52

Received provisioning data (PROR) is reconfigured in logic circuit 68 and then shifted out as provisioning data (RXSLPRAorB) to subscriber line interface modules (SLIMs) in the line units.

The EEPROM chip select 69 is controlled by bit 6 of a configuration word received on CONR from the TSA. Bit 6 is used in logic 70 to generate an EECS output which is used to activate EEPROM 50 used in storing inventory control information and provisioning information.

There are two spare HC type inverters 72 and 74 available that can be used as needed.

The LUC receives and transmits a plurality of signals that are identified in Table 1. The signals marked * are active when low.

TABLE 1

| Signal Name | Signal Description | Interface In/Out | Type |
|---|---|---|---|
| VDD1&2 | Power Supply | +5VDC | |
| VSS1-3 | Power Supply Reference | GND | |
| POR* | Power On Reset Low | Input | CMOS |
| FWDIS* | Flywheel Disable Low | Input | CMOS |
| SLADD3-0 | Slot Address 3-0 | Input | CMOS |
| LGB | Line Group Bit | Input | CMOS |
| CLK256 | 256 KHz Clock | Input | CMOS |
| CLK2048 | 2.048 MHz Clock | Input | CMOS |
| SIGR | Receive Signaling | Input | CMOS |
| SIGT | Transmit Signaling | Output | |
| CONR | Receive Configuration | Input | CMOS |
| FSXA&B | Frame Sync Transmit A & B | Output | |
| FSRA&B | Frame Sync Receive A & B | Output | |
| TXABS* | Transmit A and B Strobe | Output | |
| SLCSA&B* | SLIM Chip Select A & B Low | Output | |
| DETA3-0 | Channel A Detectors 3-0 | Input | CMOS |
| DETB3-0 | Channel B Detectors 3-0 | Input | CMOS |
| IV1I | Inverter 1 In | Input | CMOS |
| IV1O | Inverter 1 Out | Output | |
| IV2I | Inverter 2 In | Input | CMOS |
| IV2O | Inverter 2 Out | Output | |
| EECS | EEPROM Chip Select | Output | TRI-STATE |
| EECLK | EEPROM Clock | Output | |
| EEPROG* | EEPROM Program Low | Input | CMOS |
| RXCOA&B | Receive Control Output A & B | Input | CMOS |
| TXCOAB | TX Control Output A & B | Output | |
| BLEDA*/RELA0 | Busy Led A/Channel A Rel 0 | Output | OPEN-DRAIN |
| FLEDA*/RELA1 | Fail Led A/Channel A Rel 1 | Output | OPEN-DRAIN |
| RELA7-2 | Channel A Relays 7-2 | Output | |
| BLEDB*/RELB0 | Busy Led B/Channel B Rel 0 | Output | OPEN-DRAIN |
| FLEDB*/RELB1 | Fail Led B/Channel B Rel 1 | Output | OPEN-DRAIN |
| RELB7-2 | Channel B Relays 7-2 | Output | |
| RXSLPRA&B | Rec SLIM Provisioning A & B | Output | |
| ABLED* | Auxiliary Busy Led Low | Output | OPEN-DRAIN |
| AFLED* | Auxiliary Fail Led Low | Output | OPEN-DRAIN |
| PROR | Receive Provisioning | Input | CMOS |
| DPROR | Delayed Rec Provisioning | Output | |

The following is a brief functional description of the signals listed in Table 1:

| | |
|---|---|
| POR* | Power On Reset low. This input inhibits strobes to the line unit channel and resets part of the circuits in the LUC. |
| FWDIS* | Flywheel DISable low. This input disables the flywheel circuit 58. |
| SLADD3-0 | SLot ADDress 3-0. Bits 3-0 of the slot address. |
| LGB | Line Group Bit. This bit indicates which line group the line unit is installed in. LGB = 0 indicates the left side of the line shelf; LBB = 1 indicates the right side. |
| CLK256 | CLocK 256 KHz. A 256 KHz clock from the TSA 44 on the LSA 32. Low for the first 4 bits and high for the second 4 bits, and corresponding in frequency to the time slot rate. |
| CLK2048 | CLocK 2.048 MHz. A 2.048 MHz clock from the TSA 44 on the LSA 32. |
| SIGR | SIGnaling Receive. Signaling data from the TSA 44 on the LSA 32 at a data rate of 2.048 MHz, 32 time divisions multiplexed, 8 bits per sample, 8 KHz sample rate. |
| SIGT | SIGnaling Transmit. Signaling data to the TSA 44 on the LSA 32 at as data rate of 2.048 MHz, 32 time divisions multiplexed, 8 bits per sample, 8 KHz sample rate. |
| CONR | CONfiguration Receive. Configuration data from the TSA 44 on the LSA 32 at a data rate of 2.048 MHz, 32 time divisions multiplexed, 8 bits per sample, 8 KHz sample rate. |
| FSXA&B | Frame Sync Transmit A & B. Strobes to the appropriate COMBO or SLIM to indicate the beginning of transmit time slots. High active output, CMOS and TTL compatible. |
| FSRA&B | Frame Sync Receive A & B. Activation strobes to the appropriate COMBO or SLIM to indicate the beginning of receive time slots. High active output, CMOS and TTL compatible. |
| TXABS* | Transmit A and B Strobe low. A strobe used to enable tri-state backplane drivers (located outside the LUC) during the transmit time slots of channel A and/or B. Low active. Output, CMOS and TTL compatible. |
| SLCSA&B | SLim Chip Select A & B low. Strobes to the appropriate SLIM used with CLK2048 to clock control words in and out of the control interface. Active low during the receive channel. Output, CMOS and TTL compatible. |
| DETA3-0 | DETect A 3-0. These four channel A input signals are converted to serial data and gated onto a SIGT line of LUIB 40 with strobes from the time slot decoder 52 during a transmit time slot. Input, CMOS compatible. |
| DETB3-0 | DETect B 3-0. These four channel B input signals are converted to serial data and gated onto a SIGT line of LUIB 40 with strobes from the time slot decoder 52 during a transmit time slot. Input, CMOS compatible. |
| IV1I | InVerter 1 In. An input to inverter 72. Input, CMOS compatible. |
| IV1O | InVerter 1 Out. An output of inverter 72. Output, CMOS and TTL compatible. |
| IV2I | InVerter 2 In. An input to inverter 74. Input, CMOS compatible. |
| IV2O | InVerter 2 Out. An output of inverter 74. Output, CMOS and TTL compatible. |
| EECS | EEprom Chip Select. An EEPROM chip select signal to activate EEPROM 50 on the line unit. Output, Tri-state. |
| EECLK | EEprom CLocK. A 256KHz EEPROM clock the same as CLK256. Output, CMOS and TTL compatible. |
| EEPROG* | EEprom PROGram LOW. This signal tri-states the EECS output so an external device can program the EEPROM 50. This signal is only provided during factory testing and does not come from the LUIB. Output, CMOS and TTL compatible. |
| RXCOA&B | Receive Control word Output A & B. The LUC clocks in control output words from the line unit channels A and B during the RX time slots. This byte is stored until the TX time slots when it is clocked out of the TXCOAB output. Input, CMOS compatible. |
| TXCOAB | Transmit Control word Output A & B. The bytes that were clocked into the LUC on inputs RXCOA and RXCOB during the receive time slots of channels A and B are clocked out of this pin during the transmit time slots. Output, CMOS and TTL compatible. |
| RELA7-2 | RELay A 7-2. These outputs are normally used to drive relay drivers. Output, CMOS and TTL compatible. |

-continued

| | |
|---|---|
| FLEDA/ RELA1 | Failed LED A/RELay A 1. This output is used to drive the card failed LED or with a pullup resistor can be used as a normal output. Output, Open-drain. |
| BLEDA/ RELA0 | Busy LED A/RELay A O. This output is used to drive the card busy LED or with a pullup resistor can be used as a normal output. Output, open-drain. |
| RELB7-2 | RELay B 7-2. These outputs are normally used to drive relay drivers. Output, CMOS and TTL compatible. |
| FLEDB/ RELB1 | Failed LED B/RELay B 1. This output is used to drive the card failed LED or with a pullup resistor can be used as a normal output. Output, open-drain. |
| BLEDB/ RELB0 | Busy LED B/RELay B 0. This output is used to drive the card failed LED or with a pullup resistor can be used as a normal output. Output, open-drain. |
| RXSLPRA&B | Receive SLim PRovisioning A & B data. This data is used to provision a National SLIM chip used for a subscriber line interface. Output, CMOS and TTL compatible. |
| ABLED* | Auxiliary Busy LED. Output to drive the busy LED on a TACC card. Output, open-drain. |
| AFLED* | Auxiliary Failed LED. Output to drive the failed LED on the TACC card. Output, open-drain. |
| PROR | PROvisioning Receive data. Data from the TSA 44 on the LSA 32 at a data rate of 2.048Mb/s, 32 time divisions multiplexed, 8 bits per sample, 8Kb/s sample rate. Input, CMOS compatible. |
| DPROR | Delayed PROvisioning Receive data. This is the same as PROR, except that it is delayed 1/2 bit time. Output, CMOS and TTL compatible. |

Figure 5A:
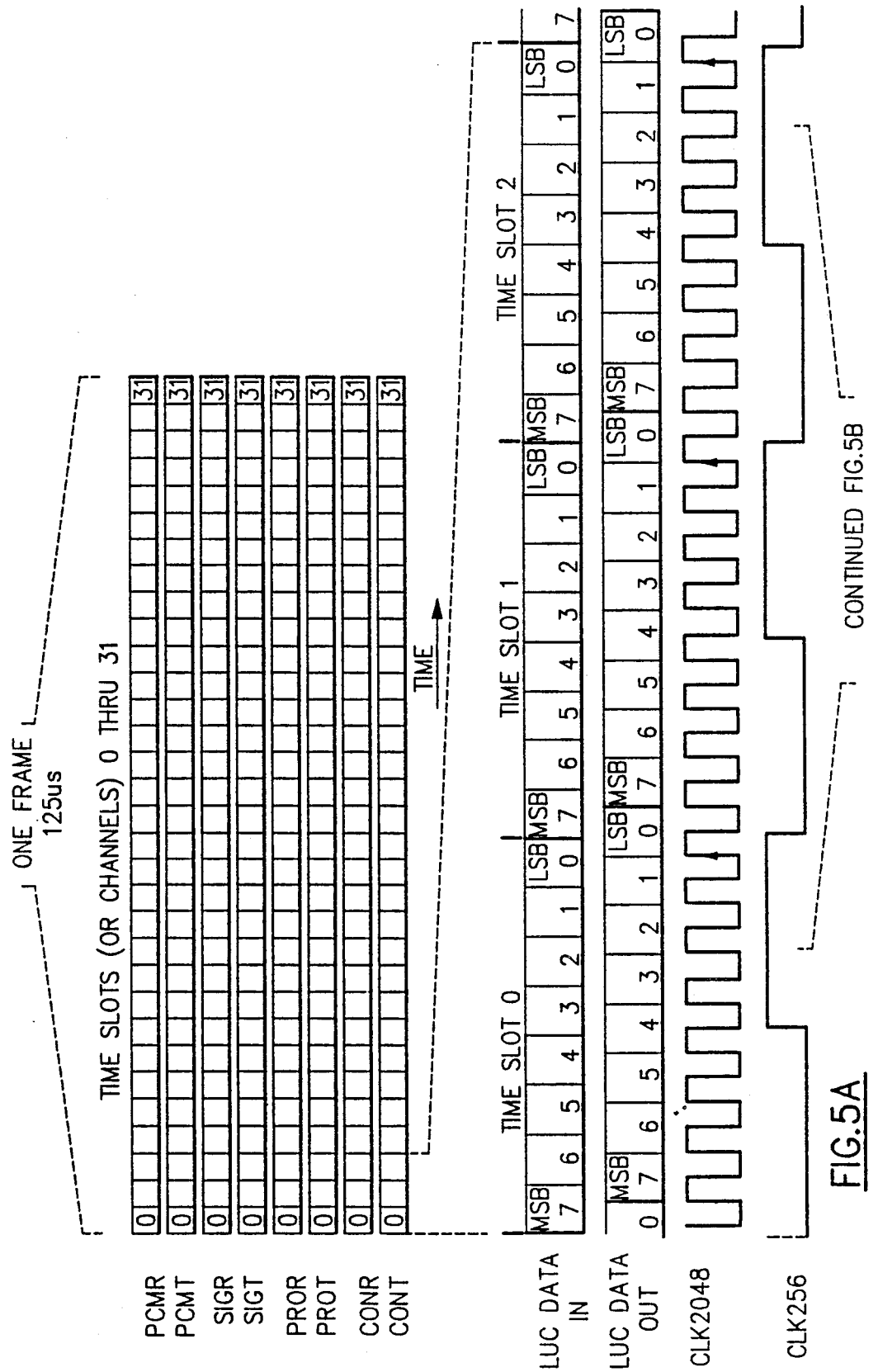
FIGS. 5 A, B and C show signal timing relationships used in the present invention.
Figure 5B:
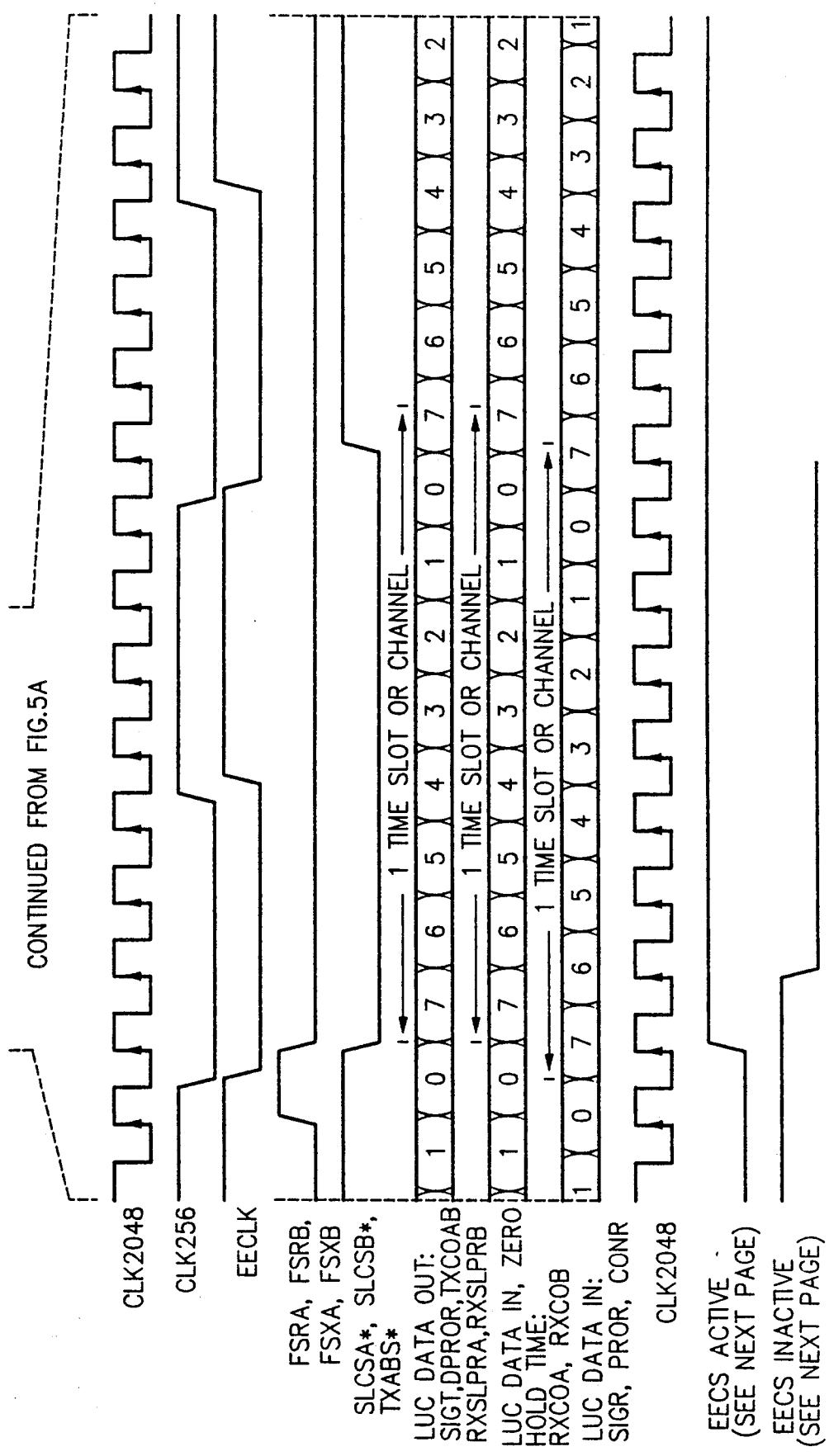
Figure 5C:
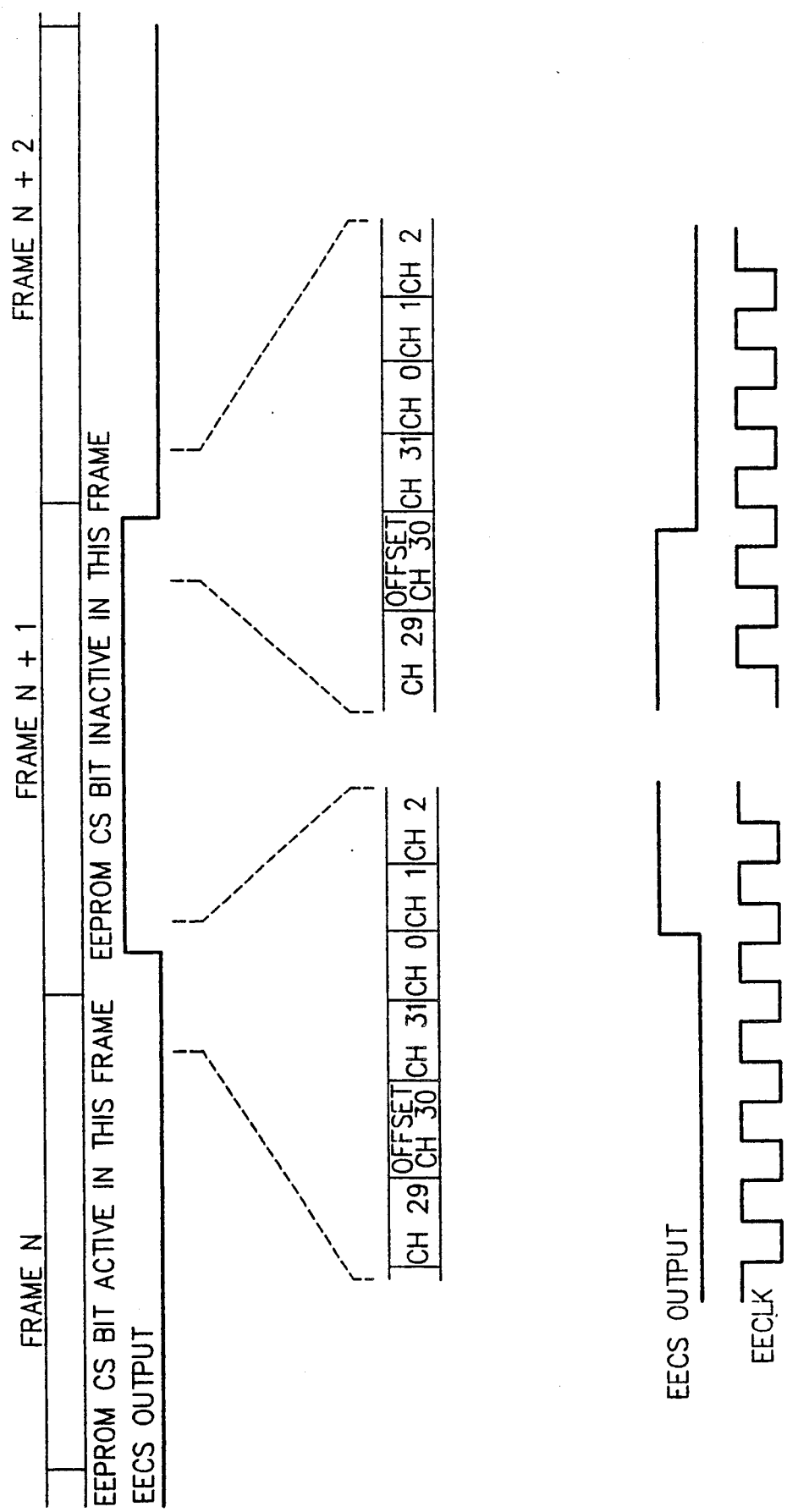

The input and output timing for the LUC is shown in FIGS. 5A to 5C. The data is transmitted on the LUIB 30 40 in 125 us frames, each having 32 time slots. Eight data lines are illustrated in FIG. 5A, representing the receive and transmit lines for PCM data (this data is connected directly to the line units and not through the LUC), signaling data, provisioning data and configuration data. Each time slot is further subdivided into eight bits, with the input LUC data that is received being ½ bit time prior to the output LUC data that is transmitted. The 2.048 MHz clock is shown having a rate equal to the bit rate and the 256 KHz clock having a rate corresponding to the time slot rate. FIG. 5B shows various timing signals in greater detail, while FIG. 5C shows the timing of the EEPROM chip select, EECS, output, particularly in relation to the beginning and ending of the frames.

Referring again to FIG. 4, an output control 76 receives the Power On Reset (POR*) signal which, when low, will force low level outputs on the FSRA, FSRB, FSXA, FSXB, AFLED*, ABLED* and high level outputs on TXABS*, SLCSA* and SLCSB*. After POR* goes high, these signals will stay in this state until the LUC decodes a valid offset number from the CONR input. If a valid offset number is loaded in during the time POR* is low, then it will take a maximum of three frames (125 us each) to start producing the strobes listed above. POR* should be held low a minimum of six cycles of the 2.048 MHz clock. A typical value for the POR* input low time is 200 ms to 500 ms. This will allow time for the line unit to be plugged in and the power supply voltages to stabilize.

CLK2048 is used to clock serial eight data bits from the CONR line into an 8-bit shift register and latch 54. Table 2 shows the format of the 8-bit byte. The Line shelf Process (LSP) programs the TSA chip to send this information to the LUC. This byte is sent two time slots before the receive data. For example, if a valid CONR byte were to be sent in time slot 5, the receive PCM, SIGR and PROR data would be in time slot 7.

TABLE 2

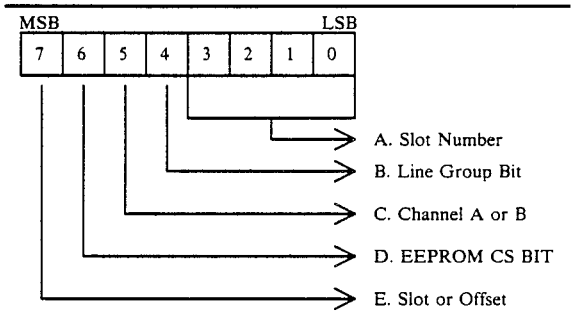

A. Slot Number: This number (0 thru F) is compared in slot comparator 56 to the slot address (SLADD3-0) from the backplane. If they are equal, the LUIB data is assigned to channel A or B of the line unit in this slot address.

B. Line Group Bit (LGB): The LGB is used in mode 2 operation (mode 2 without a time slot interchanger). In mode 2 operation, the LSA has one TSA that drives two line groups (one on the left and one on the right of the line shelf). This bit will indicate which line group the time slot is assigned to. Looking at the front of the line shelf in FIG. 3, line group "0" is on the left side and line group "1" is on the right side. If mode 2 is not used, then there are two TSAs on the LSA. In this case, the LGB must be set equal to the line group that the TSA is connected to. The LGB should be set to 0 if the TSA is connected to the left line group, and 1 if connected to the right.

C. Channel A = 0, B = 1: After the slot number and LGB have been received from the CONR data line, the channel bit indicate which channel, A or B, should be enabled.

D. EEPROM Chip Select BIT: If this bit is high, the LUC will produce starting in the next frame a high output on pin "EECS" starting two time slots after the offset channel through the next offset channel, as shown in FIG. 5C.

E. Slot = 0, Offset = 1: This bit indicates to the LUC if the received CONR data byte is a slot number or an offset number. Offset numbers only appear in time slot 30.

The line group bit (LGB) and slot address (SLADD3-0) are supplied by the backplane to the slot comparator 56. These numbers are compared to the LGB and slot address from the received CONR data from latch 54 to determine when the receive strobes should be generated.

The flywheel circuits 58 are used to prevent intermittent errors in the CONR data from causing the LUC to generate RX and TX strobes in the incorrect time slots. This flywheel is made up of a 5-bit counter, 2-bit shift register, and miscellaneous logic. The circuit is centered around the 5-bit counter that counts from 0 to 31 to count 32 time slots and is synchronized to the presently-assigned time slot. After two frames of a new slot address, the 5-bit counter is synchronized to a new time slot. When the counter is in sync, the output will be equal to zero one time slot before the strobes are produced. The outputs of the flywheel circuits are the strobes FSRA, FSRB, FSXA, FSXB, SLCSA* and SLCSB*.

The flywheel circuits 58 provide outputs to logic 59 which outputs TXABS*, a strobe used to enable tri-state backplane drivers, not part of the LUC, during the TX time slots of channels A or B.

The flywheel circuits also detect when a valid slot address and LGB have not been received in any time slot of a frame and if there have been more than two time slots with a valid slot address and LGB being received in one frame. If either case is detected, the RX and TX strobes for the appropriate channel will be disabled.

If the FWDIS* input is low, the flywheel circuits are disabled. This will allow multiple valid slot addresses to be received in the same frame without the strobes being turned off. An output strobe will be produced for each valid slot address received. This feature is required in order to assign multiple time slots to a channel in a line unit when broad band service is required by a subscriber.

The details of the flywheel circuit will be discussed subsequently.

The TSA may generate an offset between the receive and transmit channels due to delays created in the system during initialization. This offset does not change once the system is powered up, unless the TSA resyncs. The TSA sends an offset number, representing time slots, to the LUC over the CONR data line once each frame in time slot 30. The offset register 60 stores the offset number and must receive two offset numbers of equal value before the register is updated. The offset number determines the length of a variable shift register in the flywheel circuit. The RX strobe is delayed, in the variable shift register, a number of time slots equal to the offset number. This delayed RX strobe is then used as the TX strobe. For example, if the offset number is equal to zero, then the RX and TX strobes will be in the same time slot. If the offset is equal to 15, then the TX strobe will occur 15 time slots after the RX strobe. When a new offset number is loaded in, the TX strobes will be disabled for one frame so the variable shift register can clear out.

The circuitry for the variable shift register will be discussed subsequently.

The auxiliary card failed and card busy bits are also received on the CONR line in time slot 30. The byte configuration for conveying offset and the card failed and card busy bits is shown in Table 3.

TABLE 3

| MSB | | | | | | | LSB |
|---|---|---|---|---|---|---|---|
| 7 | 6 | 5 | 4 | 3 | 2 | 1 | 0 |

A. Offset Number
B. Aux. Card Busy Bit
C. Aux. Card Failed Bit
D. MSB=1 if Offset Info
   MSB=0 if Timeslot Info The signaling data SIGR for channels A and B is clocked into a shift register 62 with strobes from the flywheel circuits. The data is then stored in the latches 80 and is available on outputs RELA7-2, FLEDA/-RELA1, BLEDA/RELA0 and RELB7-2, FLEDB-/RELB1, BLEDB/RELB0. The format of the data is shown in Table 4.

TABLE 4

| | Channel A or B | | | | | | | |
| | MSB | | | | | | | LSB |
|---|---|---|---|---|---|---|---|---|
| Time Slot Bit Position | 7 | 6 | 5 | 4 | 3 | 2 | 1 | 0 |
| TSA Bit Name | A | B | C | D | 3 | 2 | 1 | 0 |

Channel A and B signaling (SIGR) and provisioning (PROR) data is received in serial format and reconfigured as shown in Table 5. This data is used to provision a National SLIM chip for channel A or B and is transmitted on RXSLPRA and RXSLPRB. The national SLIM chips are enabled by SLCSA* and SLCSB*.

TABLE 5

| | Channel A or B | | | | | | | |
| | MSB | | | | | | | LSB |
|---|---|---|---|---|---|---|---|---|
| RXSLPRA or B Bit Position | 7 | 6 | 5 | 4 | 3 | 2 | 1 | 0 |
| SIGR Bit Position | 5 | 3 | 2 | 7 | 4 | 6 | X | X |
| PROR Bit Position | X | X | X | X | X | X | 1 | 0 |

| RXSLPRA or B Bit Position | SLIM function |
|---|---|
| 7 (MSB) | Not used |
| 6 | Test Relay 2 |
| 5 | Test Relay 1 |
| 4 | Ring Relay |
| 3 | Power Denial |
| 2 | Battery Reversal |
| 1 | Network Balance 1 |
| 0 (LSB) | Network Balance 0 |

Shift register 64 receives four parallel inputs from the line unit for each channel, DETA3-0 and DETB3-0, and converts the inputs to serial data. This data is then gated onto the SIGT output pin by multiplexer 66, which is responsive to flywheel strobes in a transmit time slot for the appropriate channel. The four bits are mapped into an upper nibble of SIGT byte, while the lower nibble is zero, as shown in Table 6.

TABLE 6

|  | Channel A or B | | | | | | | |
| --- | --- | --- | --- | --- | --- | --- | --- | --- |
|  | MSB | | | | | | | LSB |
| Time Slot Bit Position | 7 | 6 | 5 | 4 | 3 | 2 | 1 | 0 |
| DETA or B 3-0 Input Bits | 3 | 2 | 1 | 0 | X | X | X | X |
| TSA Signaling bits | A | B | C | D | X | X | X | X |

When a valid CONR byte as shown in Table 2 is detected, and bit 6 is high, then in the next frame an EEPROM chip select (output EECS) will be produced by logic circuit 70. This output will go active two time slots after the offset number is received in time slot 30 and will go inactive after the next offset number is received, as shown in FIG. 5C. The TSA activates bit 6 only for one frame per access, and the LUC produces an active EECS in the following frame. But if the LUC were to receive bit 6 active for consecutive frames, the EECS output will always go inactive the two channels after the offset number. This is because the EEPROM 50 (93C46) requires that the chip select go low between accesses. The EEPROG* input to logic circuit 70 tri-states the EECS output so that an external device can program the EEPROM 50 with inventory information. However, EEPROG* is only input at the factory and not when the LUC is installed in an LU.

Figure 6A:
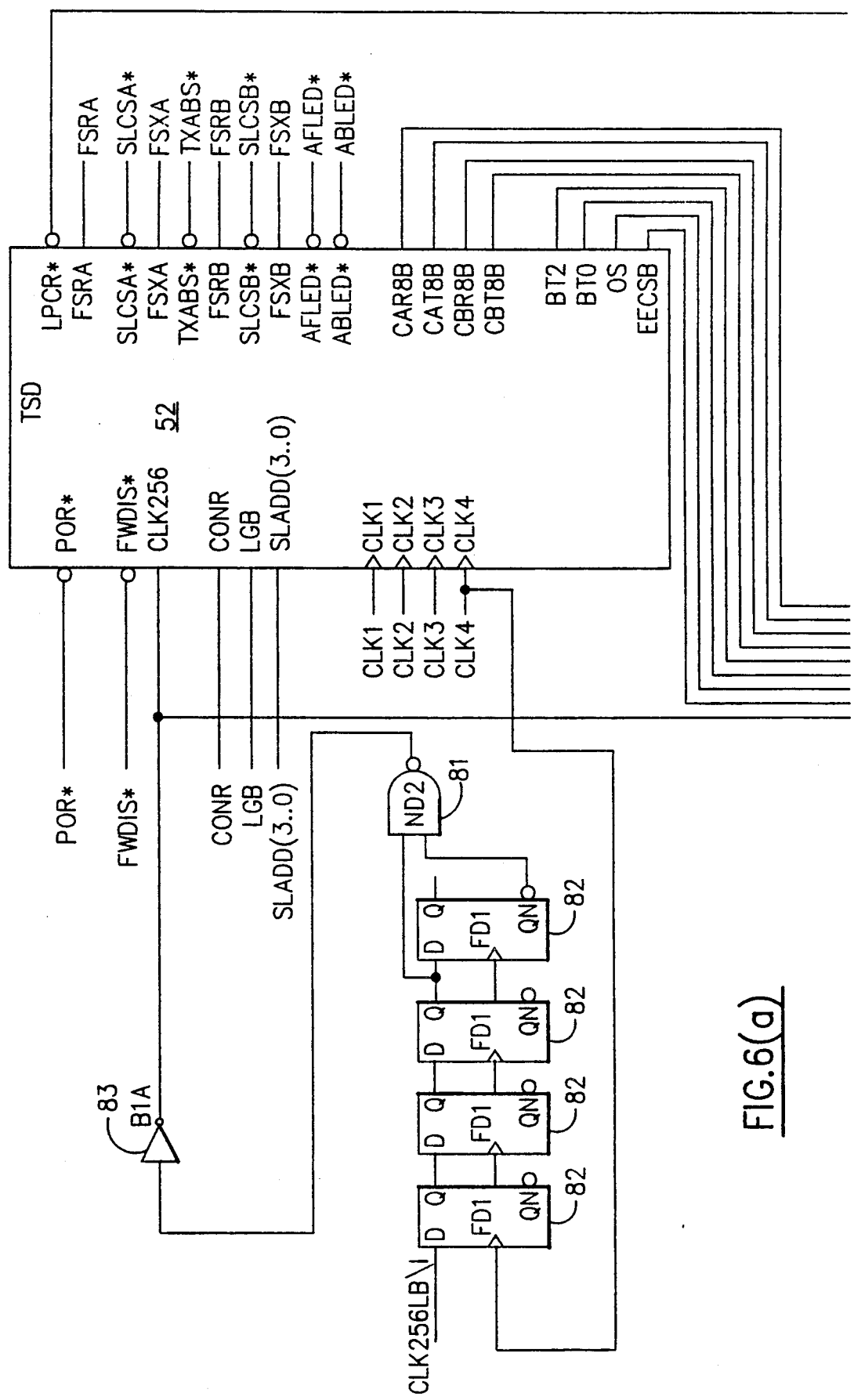
FIG. 6 illustrates a high-level schematic diagram of the present invention.
Figures 6, 6B:
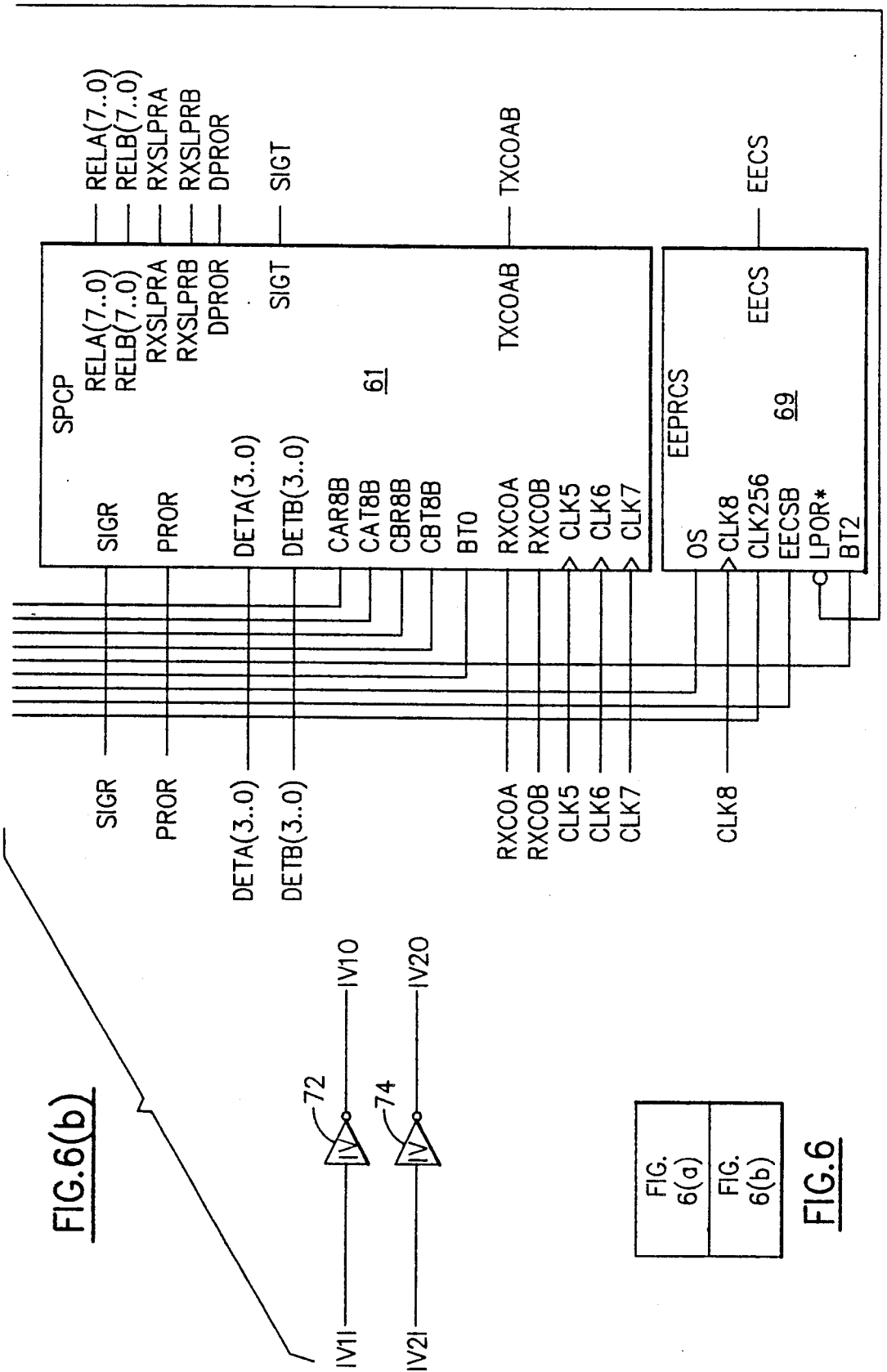

Referring to FIG. 6, there is shown a schematic diagram for the LUC 42 of the present invention. The time slot decoder 52 is shown with inputs and outputs as described in regard to FIG. 4, but with additional outputs connected to the signaling and provisioning processor 61 and to the EEPROM chip select 69. It should be noted that there are a number of clock inputs identified as CLK1 thru CLK8. These clock inputs are 2.048 MHz clock inputs and are derived through the use of a clock tree from the CLK2048 input shown in FIG. 4. The 256 KHz clock at input CLK256 is passed through a series connection of four flip-flops 82 which effectively reduces the duty cycle of the clock signal from 50 percent to approximately one-eighth, so that the clock essentially becomes a strobe that occurs during the least significant bit of each 8-bit time slot. This strobe is useful to indicate that all eight bits of the information of 8-bit data bytes have arrived. The EEPROG* input is not shown in FIG. 6, as this input is used only for factory programming of the EEPROM and is not available when the LUC is used in a line shelf. The EECLK output, which is a 256 KHz clock, is not shown in FIG. 6 as an output from the EEPROM chip select circuit 70, since the EECLK clock is used only to clock the EEPROM and is not further used in the LUC.

Figure 7A:
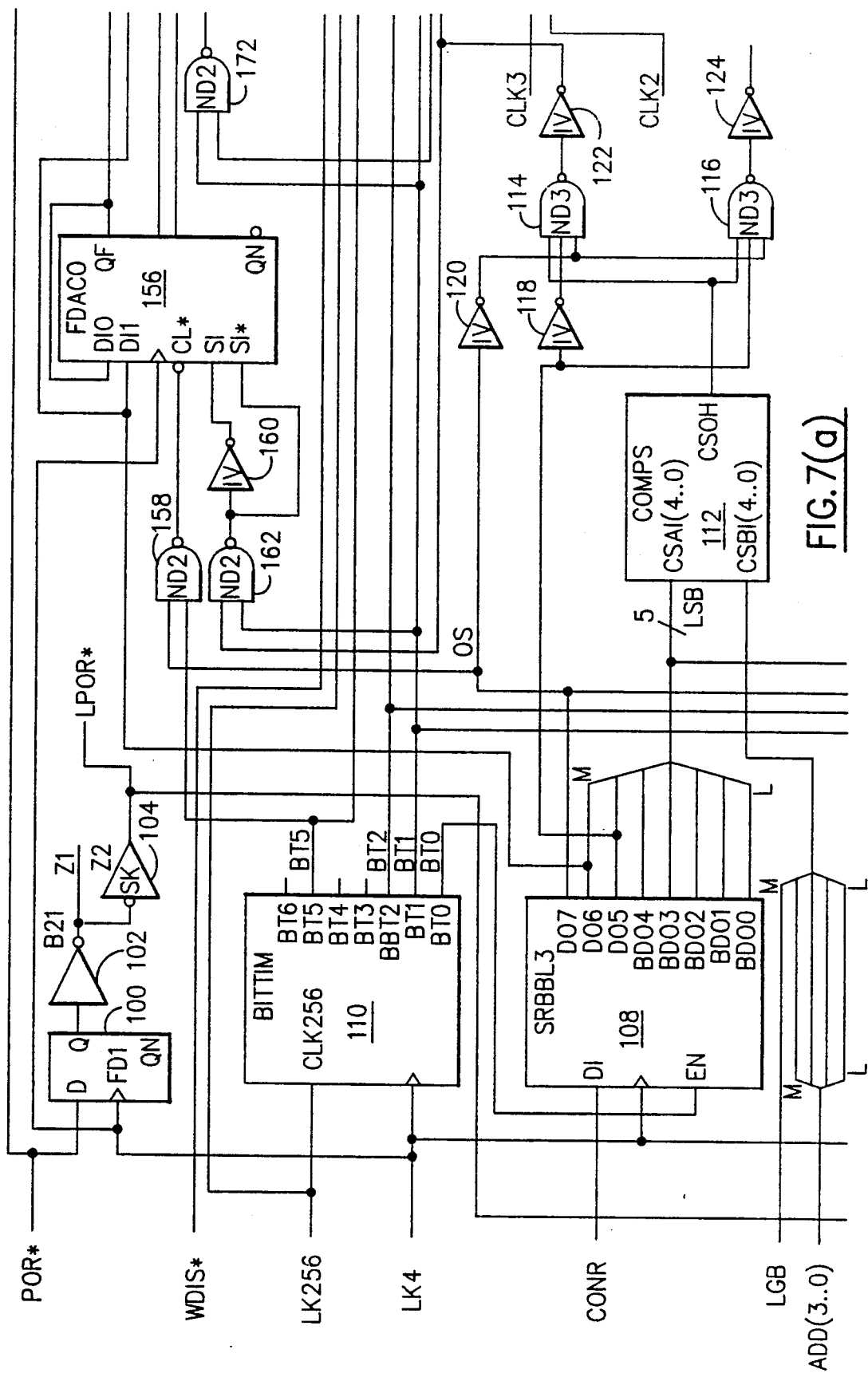
FIG. 7 shows a schematic diagram of the time slot decoder of FIG. 4.
Figure 7B:
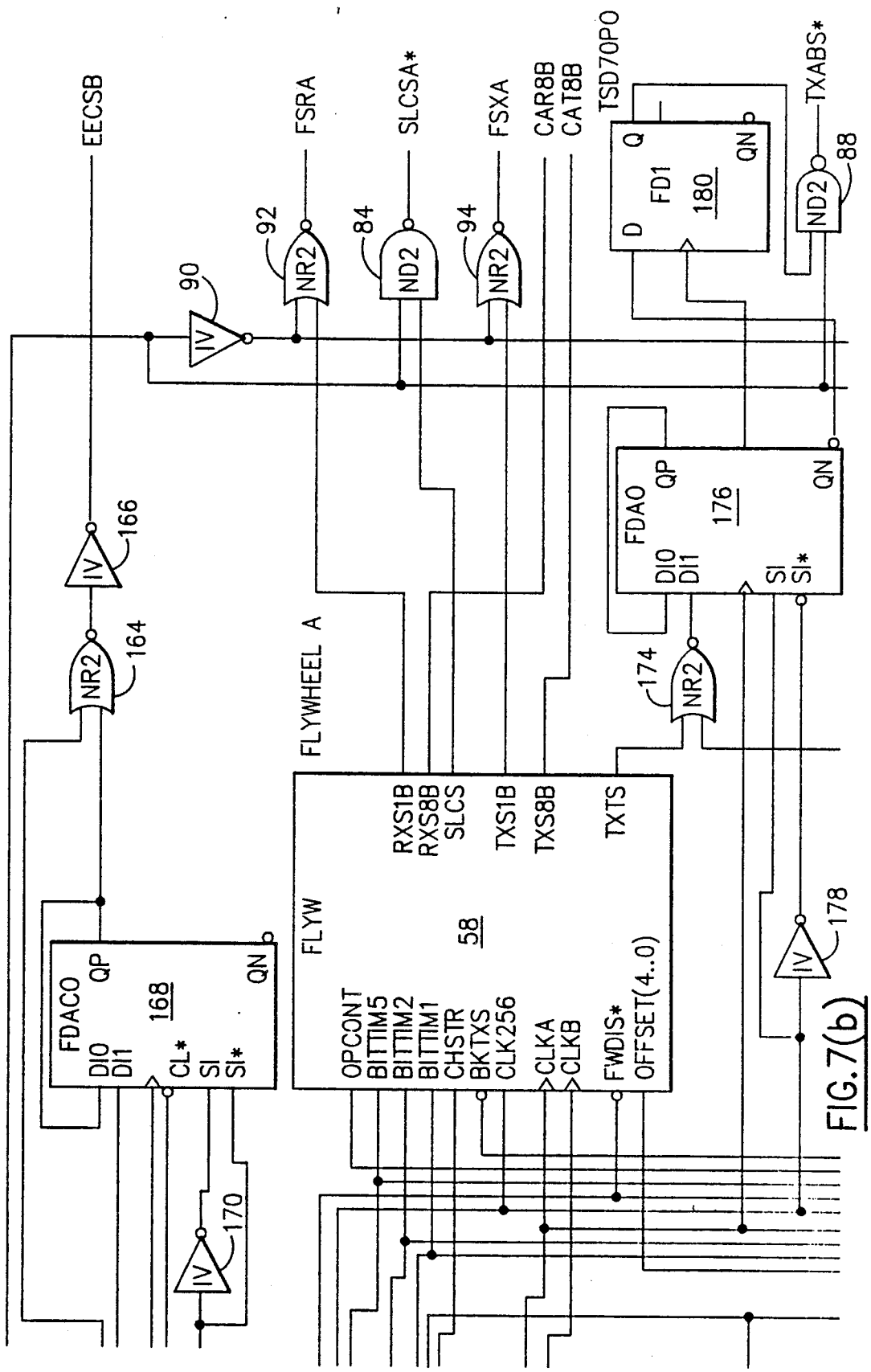
Figure 7C:
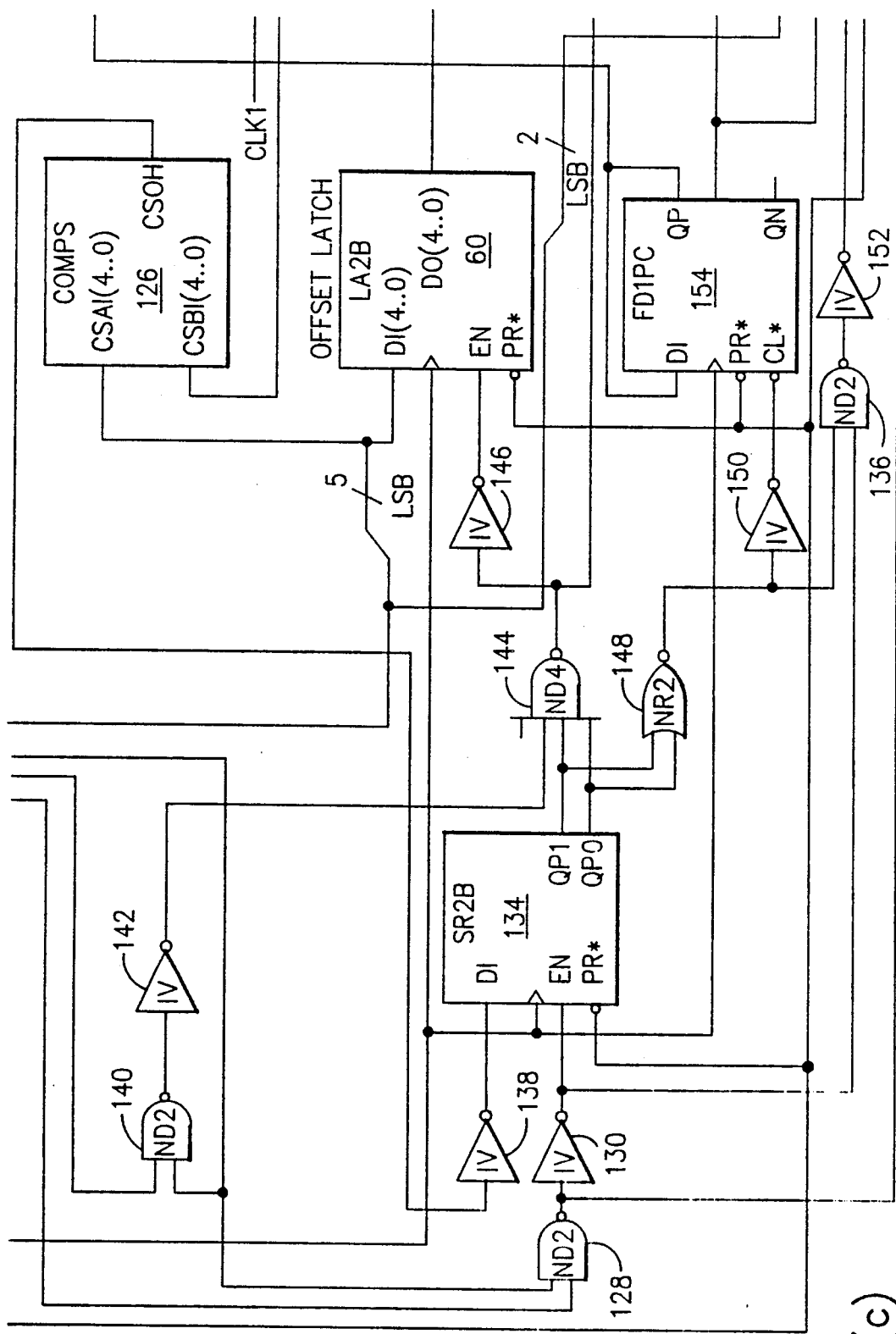

Referring to FIG. 7, there is shown a schematic diagram of the time slot decoder 52. The output control 76 shown in FIG. 4, receives the POR* signal and includes NAND gates 84, 86 and 88 which receive POR* which forces a high level at outputs SLCSA*, SLCSB* and TXABS* respectively when the POR* signal is low. The POR* signal is also provided to an inverter 90 having an output connected to NOR gates 92, 94, 96 and 98 for forcing low-level outputs on FSRA, FSXA, FSRB and FSXB when the POR* signal is low. The POR* signal is provided to a flip-flop 100 having an output connected to inverter 102, which is further connected to inverter 104. Inverter 104 provides an output LPOR* which is connected to the EEPROM chip select 69, as shown in FIG. 6 and is further connected to a clear input of a latch circuit 106 which drives the AFLED* and ABLED* signals. The clear input holds the latch outputs low when the POR* signal is low. The output of inverter 104 is also connected to preset, PR*, inputs of shift register 134, latch 60 and flip-flop 154 and covers their outputs to go high when POR* is low.

The shift register and latch 54 functions as a serial-to-parallel converter. Circuit 108 receives the CONR data which is clocked in at 2.048 Mb/s to eight D-flops forming the shift register. The outputs of the eight D-flops are fed to the first inputs of the eight 2-input D-flops which form the latch. The input selects of the 2-input D-flops are enabled by a bit 0 strobe from a delay circuit 110 so that at bit 0 of each time slot the CONR data from the previous time slot enters the D11 input. After bit 0, the input selects change and input D10 is active and receives a fed-back output forming a latch. Delay circuit 110 is formed of seven D-flops and is used to delay the 256 KHz clock and provide seven outputs representing strobes occurring at each of bit times 0-6 within each time slot.

The outputs of the serial-to-parallel converter 108 are distributed throughout the circuit with the five least significant bits being provided to a comparator circuit 112, which is part of the slot comparator 56. The SLADD3-0 inputs and the LGB input are provided to the comparator circuit 112, where the five bits are compared. A match is indicated at an output of comparator 112. A timing strobe output of comparator 112 is provided to NAND gates 114 and 116 for the channel A and channel B strobes respectively. The bit 5 output from the serial-to-parallel converter 108 is provided directly to an input of NAND gate 116 and to an input of an inverter 118, the output of which is provided to an input of NAND gate 114, thereby providing information to the NAND gates as to whether or not the strobe is a channel A or channel B strobe for an identified line unit. Bit 7 from the serial-to-parallel converter 108 is provided to an inverter 120, the output of which is provided to each of the NAND gates 114 and 116 to indicate to the NAND gates whether the configuration word CONR is providing time slot information or offset information. The outputs of the NAND gates 114 and 116 are provided to inverters 122 and 124 respectively, which inverters have outputs connected to the channel strobe CHSTR input for each flywheel circuit 58 for channels A and B of the line unit.

The five least significant bit outputs from the serial-to-parallel converter circuit 108 are also provided to an offset register 60 and a five-bit comparator circuit 126 which receives as a second input a five-bit output from the offset register 60. Offset register 60 is essentially a five-bit latch comprising five 2-input D-flops. Bit 7 from the serial-to-parallel converter 108, which when high indicates offset information is being transmitted, is connected to a NAND gate 128, as is the bit 1 output strobe from delay circuit 110. The output of NAND gate 128 is connected to an inverter 130 and an input of a flip-flop 132. The output of inverter 130 is connected to an enable input of a two-bit shift register 134 and to an input of a NAND gate 136.

Shift register 134 receives an input through an inverter 138 from the output of comparator circuit 126, which indicates whether or not the offset number has changed from the number in register 60. Shift register 134 also receives a preset input from inverter 104 which can essentially disable the register. The bit 7 output from the serial-to-parallel converter 108 is also provided to an input of a NAND gate 140, which also receives the bit 2 strobe from the delay circuit 110. NAND gate 140 provides an output during bit time 2 to inverter 142 when offset information is being received. The output of inverter 142 is provided to a NAND gate 144 along with the outputs of the shift register 134. Shift register 134 is a two-bit shift register and will provide two zero outputs when two identical offset numbers have been detected from comparator 126. The output of NAND gate 144 is provided to an enable input of shift register 60 through an inverter 146 to enable the register, so that a valid offset number may be latched therein and provided at an output to an offset input of both flywheel circuits 58. Register 60 also receives as a preset input the output of inverter 104 to disable the register. The output of NAND gate 144 is connected to a clear input of flip-flop 132 providing an indication thereto that a new offset number was latched into register 60. An output from flip-flop 132 is provided to the BKTXS inputs of the flywheel circuits 58. The purpose of this output is to disable transmit strobes immediately after a new offset number is latched.

The two outputs of shift register 134 are provided to the inputs of a NOR gate 148, the output of which is provided to an inverter 150 and an input of NAND gate 136. The inputs to NAND gate 136 provide logic indicating whether the input CONR byte contains offset information or time slot information, and whether two identical bytes have been received. The output of NAND gate 136 is provided to an inverter 152, the output of which is provided to the enable input of latch 106. Latch 106 receives bits 5 and 6 from the output of the serial-to-parallel converter 108, which bits are indicative of the auxiliary card being busy or failed, and provides two output bits to the AFLED* and the ABLED* outputs.

A flip-flop 154 receives as a preset input the output of inverter 104. The output of inverter 150 is provided to a clear input, which clears the flip-flop after two matched offset numbers have been received, which should occur two frames after circuit initialization. The output from flip-flop 154 is connected to OPCONT inputs of flywheels 58. The OPCONT signal provides for power up disable of the flywheel and also disable until valid offset number are latched.

Bit 6 from the serial-to-parallel converter 108, which represents the EEPROM chip select bit, is provided to an input of a two-input flip-flop 156. A NAND gate 158 receives a bit 5 strobe from the delay circuit 110 and bit 7 from the serial-to-parallel converter 108, which indicates whether the byte contains time slot information or offset information. Select inputs on flip-flop 156 are connected respectively to the inputs and outputs of an inverter 160, which receives the output of a NAND gate 162. Inputs to NAND gate 162 are derived from a bit 1 strobe out of delay circuit 110 and the channel A strobe from inverter 122. The output of flip-flop 156 is provided to an input of a NOR gate 164, which has an output connected to an inverter 166 which provides the EECSB signal which is directed to the EEPROM chip select 69. A flip-flop 168 identical to flip-flop 156 is connected in an identical manner as flip-flop 156, with the exception that NAND gate 172 has an input connected to the channel B strobe instead of the channel A strobe. The output of flip-flop 168 is connected to an input of NOR gate 164.

The flywheel circuits 58 receive a number of additional strobes and clock signals as, for example, bits 1, 2 and 5 from the delay circuit 110, the 256 KHz clock and two clock inputs, both of which receive the 2.048 MHz clock. The flywheel disable FWDIS* signal is provided to the flywheel circuit also. The flywheel circuit 58 for channel A provides an RXSIB output to NOR gate 92, which provides the FSRA output. An output RXS8B from the flywheel circuit for channel A provides the CAR8B output. The channel A flywheel circuit provides an SLCS output to NAND gate 84, which provides the SLCSA* output. A TXSIB output from the channel A flywheel circuit is provided to NOR gate 94, which generates the FXSA output. A TXS8B output from the channel A flywheel circuit provides the CAT8B output. A TXTS output is provided to an input of a NOR gate 174.

Outputs from the flywheel circuit for channel B are similarly connected to provide the outputs FSRB, SLCSB*, FSXB, CBR8B and CBT8B. An output of NOR gate 174 is connected to a two-input D-flop 176 which has its select inputs connected to the input and output of an inverter 178, the input of which is fed by the 256 KHz clock. The output of flip-flop 176 is connected to an input of a flip-flop 180 which has an output connected to an input of NAND gate 88 which generates the TXABS* output.

Figure 8A:
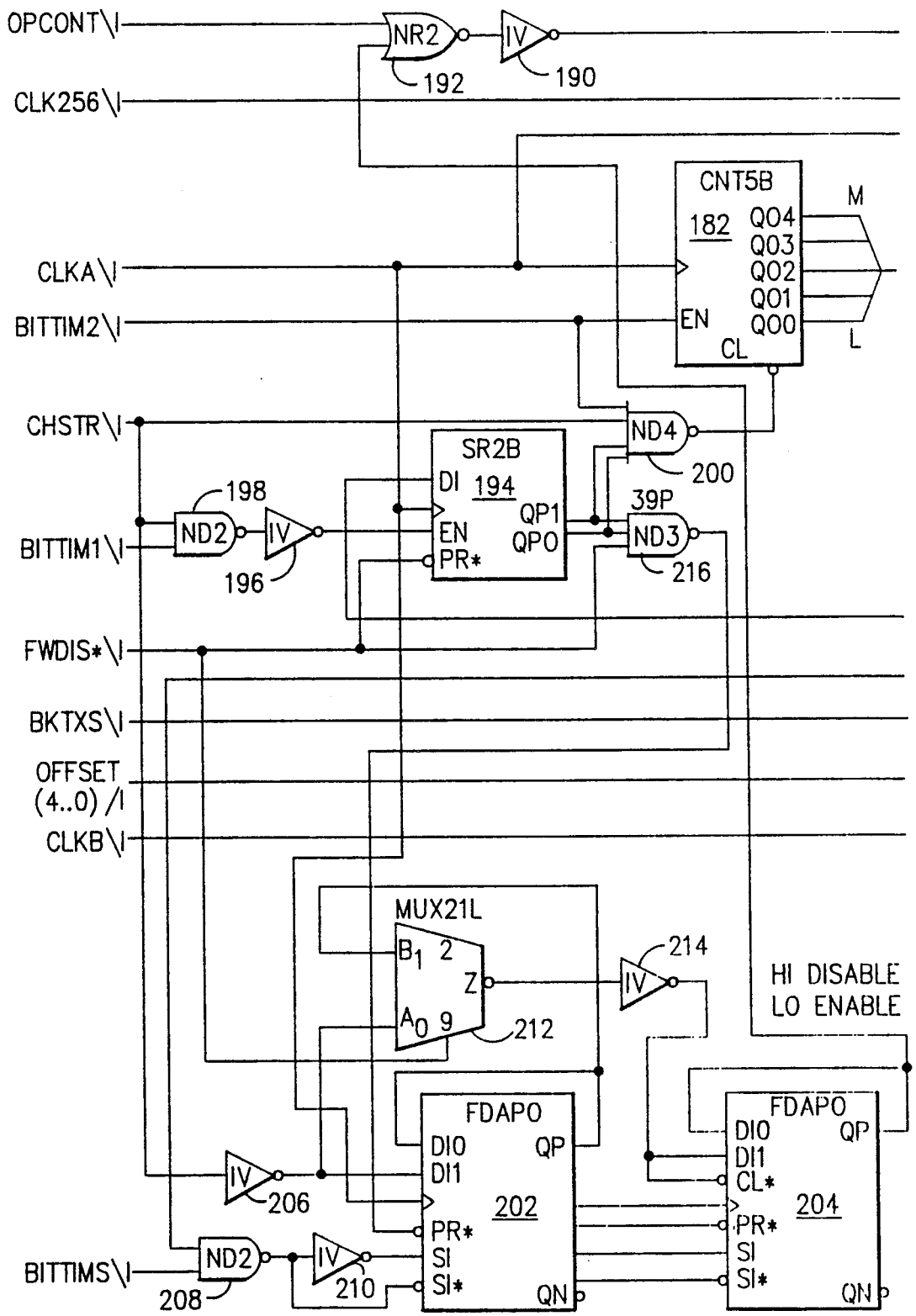
FIG. 8 shows a schematic diagram of the flywheel circuit of FIG. 7.

Referring to FIG. 8, there is shown a schematic diagram for a flywheel circuit 58. The circuit is centered around a five-bit counter 182 which receives a 2.048 MHz clock signal but is only enabled during bit time 2, when it receives a bit time 2 strobe from input BITTIM2. While in a steady state with the clock synchronized with a previous channel strobe, the clock repeatedly counts from 0 to 31 and provides outputs to a 0 and 31 detector 184, which provides at output DZH a high-level activation strobe when the input count is 0 and provides at an output D31L a low output when the input count is 31. The DZH output is connected to a NAND gate 186, which also receives an input from the 256 KHz clock to provide an output to a flip-flop 188 which generates the receive strobe, RXSIB The flip-flop 188 also has a preset input PR connected to the output of an inverter 190, which is connected to the output of a NOR gate 192, which receives as one input the output control signal OPCONT. Thus, the five-bit counter 182 causes receive strobe signals to be continuously generated under the assumption that it is properly synchronized with an input channel strobe CHSTR The OPCONT signal can disable flip-flop 188 on power up, or if there are more than two channel strobes per frame, or if there are no channel strobes per frame.

The counter may be re-synchronized to a channel strobe, CHSTR, arriving during a new time slot after the strobe appears in the new time slot for two frames. This is accomplished through the use of a two-bit shift register 194. The two-bit shift register has its input connected to output D31L of detector 184 and receives a 0 signal during count 31 of the five-bit counter. The enable input of shift register 194 is connected to the output of an inverter 196 which is further connected to the output of a NAND gate 198. NAND gate 198 receives as one input the channel strobe, CHSTR, and as a second input a bit 1 strobe BITTIM1. Thus, during bit 1 of a time slot having a channel strobe, the shift register 194 is enabled and will normally enter the 0 level at output D31L of detector 184, thereby providing a 0 at output OP0 of the shift register. If the channel strobe CHSTR appears in a time slot other than the one to which the counter is synchronized, the output from the detector 184 will not be low when register 194 is enabled, and the register will be incremented to provide a 1 output at OP0. If a second channel strobe arrives out of sync with the five-bit counter, the shift register 184 will again be incremented to provide two 1-level outputs.

It should be noted that the detection of the 0-level output of detector 184 occurs at a count of 31, which is essentially one time slot prior to the time when the channel strobe should occur. This is permissible because the counter 182 is not enabled and does not increment until the bit 2 time provided by BITTIM2. Thus, the counter is incremented one bit time after the output of the detector 184 is sensed.

A NAND gate 200 receives four inputs, including the two outputs of the 2-bit shift register 194, the channel strobe, CHSTR, and the bit time 2 strobe BITTIM2. The output of NAND gate 200 is connected to a clear input of the five-bit counter 182. Thus, if two channel strobes are found not to be in sync with the five-bit counter, the counter is then cleared during bit time 2, when the next channel strobe occurs, thereby re-synchronizing the five-bit counter to the new channel strobe.

Shift register 194 has a preset input connected to the FWDIS* flywheel disable signal, which is low when the flywheel is to be disabled. A low input on the preset causes both outputs of 194 to go high, with the result that the counter 182 is cleared each time a channel strobe, CHSTR, arrives at NAND gate 200. Clearing the counter provides a zero output or count which, as mentioned earlier, provides a receive strobe output RXSIB. Thus, the flywheel is disabled and a receive strobe is generated for each input CHSTR.

As mentioned earlier, the five-bit counter 182 will continuously generate strobe outputs but can be re-synchronized to a new channel strobe time slot by the occurrence of a new channel strobe for two frames. Provisions must be made to disable the receive strobes if the channel strobe, CHSTR, ceases for two frames. To provide this capability, two 2-input D-type flip-flops 202 and 204 are provided. Flip-flop 202 receives at an input DI1 the channel strobe, CHSTR, through an inverter 206. Select inputs SI and SI* are provided with inputs sensitive to the DZH signal from detector 184 and a bit time 5 signal. A NAND gate 208 receives the DZH signal and the bit time 5 strobe, BITTIM5, so that the DZH signal is sensed after the counter 182 has been incremented at bit time 2. An output of NAND gate 208 is provided to the SI* input of flip-flop 202 and to an inverter 210, the output of which is provided to the SI input of flip-flop 202, so that during bit time 5, when the counter is at 0, the channel strobe, CHSTR, will be entered into the flip-flop as a 0-level signal. When bit time 5 ends, the input of the flip-flop 202 switches to DI0, which receives its input from the output of the flip-flop, thus maintaining the output of flip-flop 202 at a 0 level. If the channel strobe was not present, a 1-level signal would enter flip-flop 202 at input DI1, generating a 1-level output which would be maintained after the signals to the select inputs shift at the termination of the bit 5 strobe or when the DZH goes low. The output of flip-flop 202, while being fed back to input DI0, is also fed to an input of multiplexer 212, which input would normally be fed to the output and to an inverter 214, the output of which is connected to the DI1 and clear input of flip-flop 204. If the output of flip-flop 202 is 0, this will appear as 0 at the DI1 and clear inputs of flip-flop 204, resulting in a 0-level signal at its output. The input select signals of flip-flop 204 are connected to the input select signals of flip-flop 202; therefore the inputs will switch simultaneously with flip-flop 202, and the 0-level signal at the output will be maintained and fed back to the input DI0.

If a channel strobe was missing and flip-flop 202 was set to the 1 state, this would appear at the DI1 input of flip-flop 204 and be ready to be clocked in at the next frame, when the input is switched from DI0 to DI1. If, in the next frame, the channel strobe is still missing, the output of flip-flop 202 will remain 1, and the output of flip-flop 204 will change to a 1 level. If perchance the channel strobe had returned to its proper timing, flip-flop 202 would revert back to a 0-level output, while flip-flop 204 would clock in the 1-level signal during bit time 5 but would immediately thereafter receive the 0-level output from flip-flop 202 at its clear input, so that by bit time 7 the output of flip-flop 204 would be cleared to a 0 level.

The output of flip-flop 204 is connected to an input of NOR gate 192, so that when the output is at a 1 level, the flywheel outputs are disabled, as previously mentioned in regard to the function of signal OPCONT. Thus, flip-flops 202 and 204 function to disable the outputs if the channel strobe, CHSTR, is missing for two consecutive frames.

The select input of multiplexer 212 is connected to the flywheel disable FWDIS* signal so that when the flywheel disable signal is low, the multiplexer 212 receives its input from the output of inverter 206 to essentially by-pass flip-flop 202. Flip-flop 204 will continue to function and provide an output level 1, if the channel strobe CHSTR does not occur when DZH is high, to thereby disable the outputs.

A NAND gate 216 is connected to receive the two outputs of the shift register 194 and the flywheel disable signal, so as to provide a 0-level output only when the flywheel is not being disabled and when the counter is being re-synchronized by the occurrence of two 1-level signals from the shift register 194. The output of NAND gate 216 is connected to the preset inputs of both flip-flops 202 and 204 to effectively drive the outputs to a 1 level and thereby disable the strobe outputs from the circuit. This disable signal will continue until the counter is resynchronized with the incoming channel strobe and at least one of the outputs of shift register 94 reverts to a 0 level. Thus, no strobe outputs are provided during a re-synchronization time.

Figure 9A:
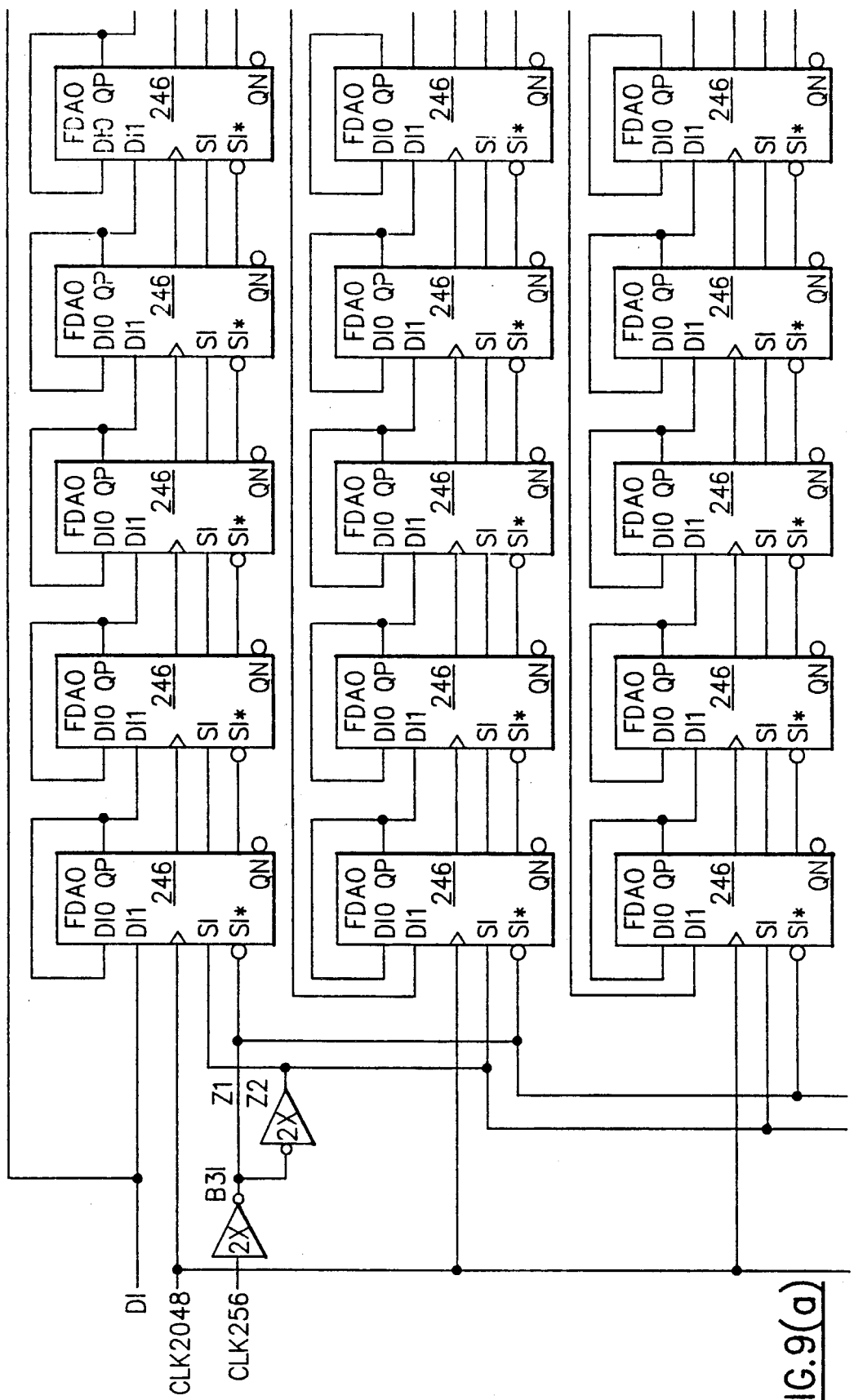
FIG. 9 shows a schematic diagram of the variable shift register of FIG. 8.
Figure 9B:
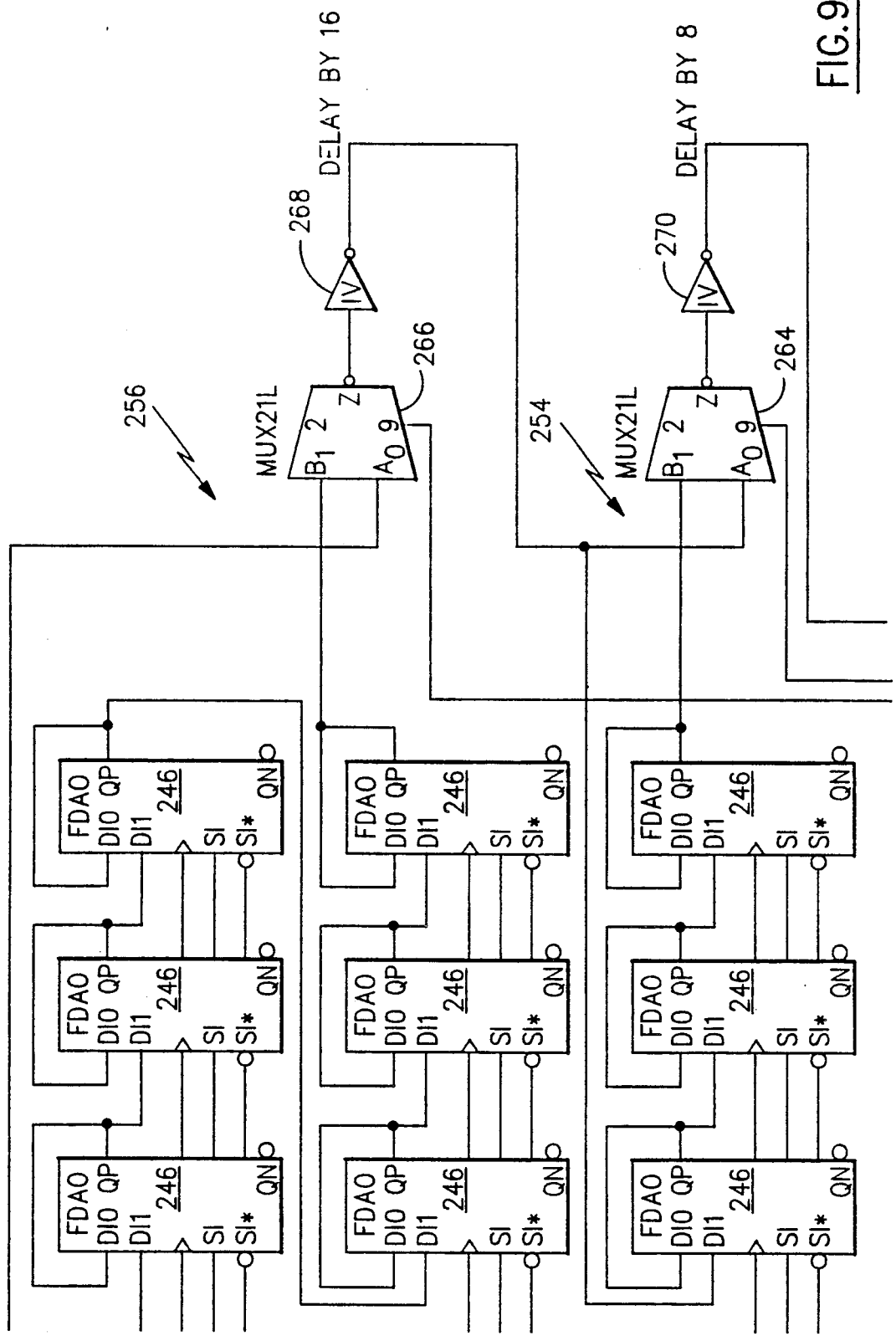
Figure 9C:
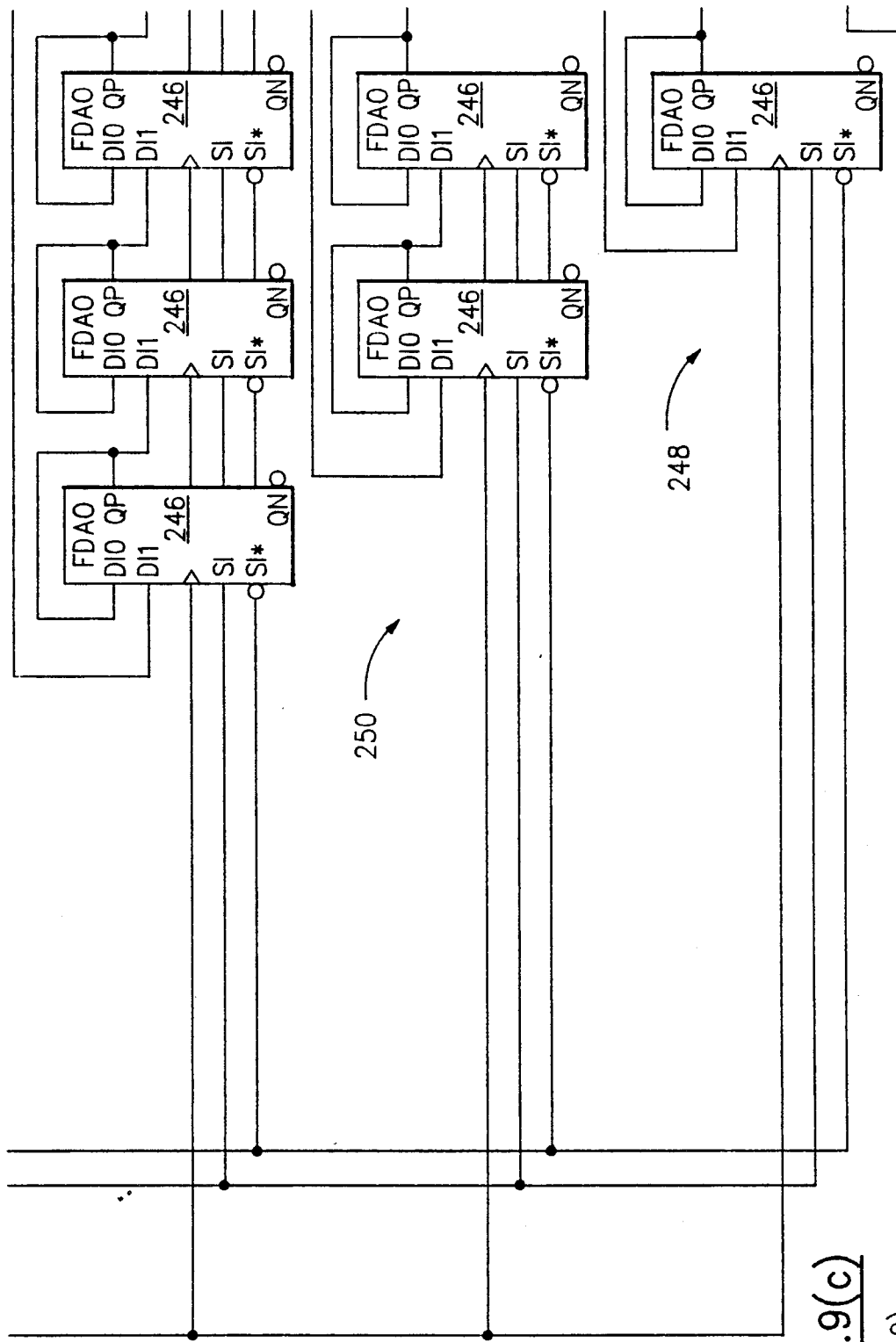
Figures 9, 9D:
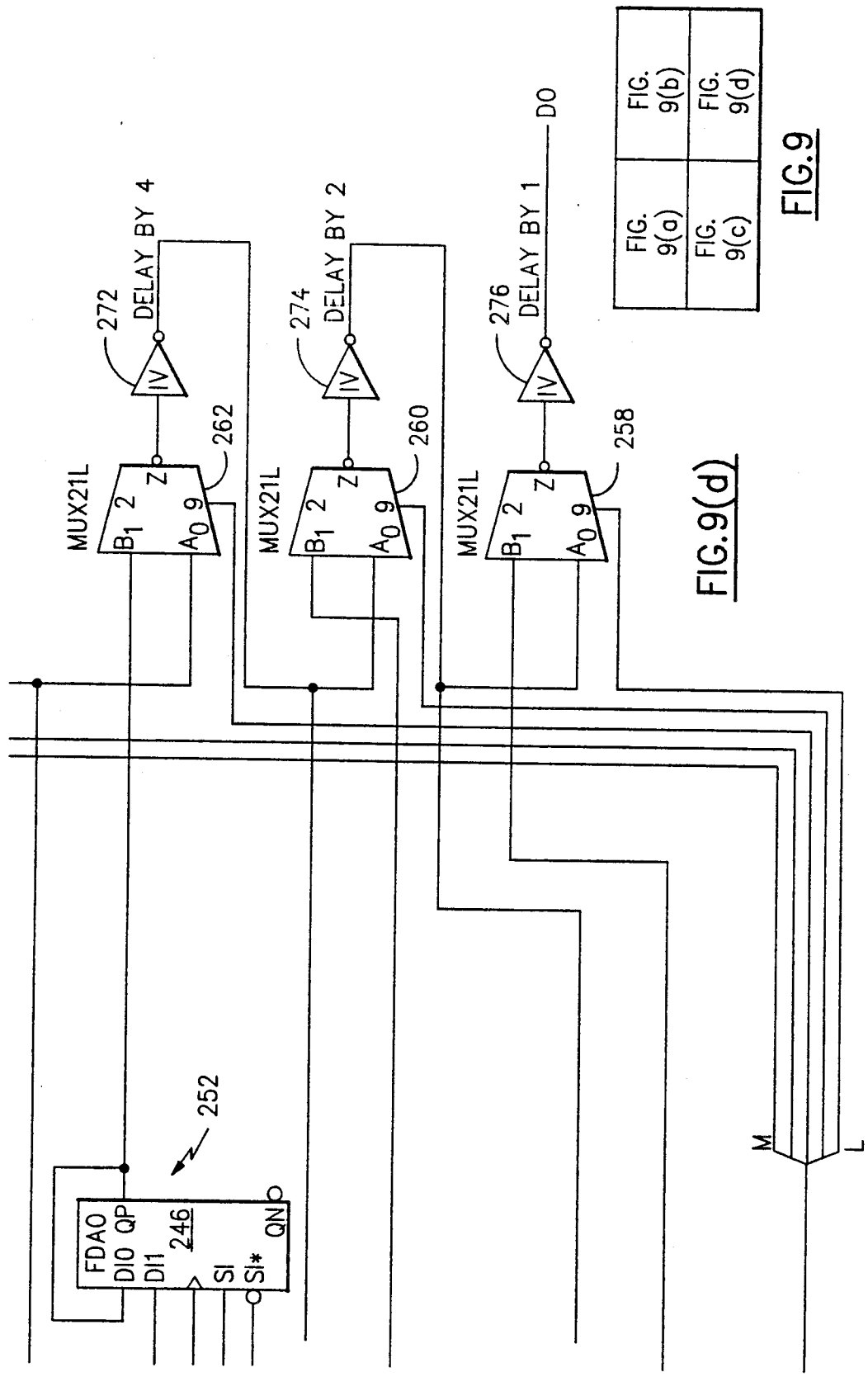

During normal operation, the receive strobe is essentially initiated by a high on the DZH output detector 184. This output is provided to an input of a variable shift register 218 which functions to delay the receive strobe by a number of time slots corresponding to the offset number received at the offset input. A circuit diagram for a variable shift register is shown in FIG. 9 and will be described subsequently. The variable shift register receives the 256 KHz clock and the 2.048 MHz clock and provides an output to a NAND gate 220, which also receives inputs from the 256 KHz clock and an input BKTXS signal NAND gate 220 provides an output to a flip-flop 222, which generates the transmit strobe TXS1B. Flip-flop 222 also receives the 2.048 MHz clock and the output of inverter 190 is provided to a preset input which functions to disable the flip-flop.

The BKTXS input to NAND gate 220 is generated by flip-flop 132 of FIG. 7, which functions to disable the transmit strobes for one frame after a new offset number is received to prevent erroneous transmit strobes from being generated.

The output of NAND gate 220 is connected to a NOR gate 224 which has a second input connected to the output of inverter 190 and provides the output TXTS indicating the occurrence of a transmit time slot. The output of NOR gate 224 is essentially disabled by a high output from inverter 190.

Flip-flop 226 has its input select inputs connected to the 256 KHz clock so that SI receives the clock directly and SI* receives it through an inverter 228. Input DI1 receives the output of NAND gate 186 corresponding to a receive strobe output. The output of flip-flop 226 is fed back to the input to maintain the same state, and the inverted output is connected to a flip-flop 230 which provides the SLCS SLIM chip select signal A flip-flop 232 has its DI1 input connected to the output of NAND gate 186 and its DI0 input connected to its output. A preset input is connected to an output of an inverter 234 which has its input connected to inverter 190 for disabling the flip-flop as previously discussed. The input select inputs of flip-flop 232 are connected to the same input select signals as flip-flop 226 so as to activate input DI1 to receive the output of NAND gate 186 during the generation of a receive strobe. The inverted output of flip-flop 232 is connected to an inverter 236 which is connected to another inverter 238 to provide the RXS8B output signal.

A flip-flop 240 is connected in a manner similar to flip-flop 232, with the exception that the DII input is connected to the output of NAND gate 220 to receive a transmit strobe signal. The inverted output of flip-flop 240 is connected to inverters 242 and 244 to provide the TXS8B output signal Referring to FIG. 9, there is shown a schematic diagram of the variable shift register 218. The variable shift register is used to delay the receive strobe by a variable number of time slots to generate the transmit strobe. The receive strobe signal is provided to the DI input from the DZH output of detector 184. The receive strobe can be delayed from 0 to 31 time slots in accordance with an offset number provided by the offset register 60 in FIG. 7. The offset number is a five-bit number provided at the offset input. The variable shift register receives the 2.048 MHz clock and the 256 KHz clock. The shift register comprises a plurality of flip-flops 246 which are essentially arranged to form a one-bit shift register 248, a two-bit shift register 250, a four-bit shift register 252, an eight-bit shift register 254 and a 16-bit shift register 256. The five offset bit lines are connected to five 2-input multiplexers 258-266, representing the least to the most significant bits of the offset number. Multiplexer 266 has a first input connected directly to the DI input to receive the receive strobe. A second input of multiplexer 266 is connected to the output of the 16-bit shift register. The output of the multiplexer provides the DI input without delay if the select input, the most significant bit of the offset number, is 0. The multiplexer provides the DI input delayed by 16 time slots if the select input receives a 1-level signal from the most significant bit of the offset number. The output of multiplexer 266 is connected to an inverter 268, the output of which is connected to an input of multiplexer 264, the other input of which is connected to the output of the eight-bit shift register 254. The input of the eight-bit shift register 254 is also connected to the output of the inverter 268. Depending upon the setting of the multiplexer 264, the DI input is delayed another eight time slots, or bypasses the eight-bit shift register. In like manner, the output of multiplexer 264 is connected to an inverter 270, the output of which is connected to the input of the four-bit shift register 252 and to an input of the multiplexer 262, the other input of which is connected to the output of the four-bit shift register 252. Multiplexer 262 functions to either bypass the four-bit shift register or to pass the DI input through the shift register to provide an four additional time slots of delay. Multiplexers 262, 260 and 258 each have outputs connected to inverters 272-276 respectively, and multiplexers 260 and 258 function in a manner similar to the other multiplexers to either bypass their associated shift registers or pass the DI input through the shift register to provide additional delay.

Thus, the variable shift register can be set to provide any delay time from 0–31 time slots, depending upon the five-bit offset number received at the offset input.

Thus, the line unit interface circuit of the present invention performs all of the functions necessary to interface a line unit to the TSA via the line unit interface bus. These functions include the generation of a plurality of framing and timing signals necessary to process signaling, provisioning and configuration data provided by the TSA. A major function of the LUC is to decode the configuration data for the purpose of time slot assignment and for establishing an offset number pertaining to the time delay between a receive strobe and a transmit strobe.

A variable shift register is utilized to provide a delay between the receive and transmit strobes which corresponds to the offset generated by the TSA. A flywheel circuit is provided for preventing the erroneous assignment of time slots resulting from noise or false signals received on the line unit interface bus from the TSA.

What is claimed is:

1. An interface circuit for use on a line unit in a line shelf of a digital loop carrier for interfacing with a bus connected to line shelf common equipment, said bus conveying signaling data, time slot configuration data and provisioning data for a plurality of line units, said interface circuit comprising:
   means, connected to said bus, for receiving and directing said signaling data to appropriate circuit elements within the line unit;
   means, connected to detectors on the line unit, for receiving signaling therefrom and multiplexing said signaling onto said bus for transmission to the common equipment;
   means, connected to said bus, for receiving and reconfiguring the provisioning data and shifting the reconfigured provisioning data to the line unit for use in a subscriber line circuit; and
   means, connected to said bus, for receiving and decoding said time slot configuration data and for activating the line unit in accordance with the decoded time slot configuration data.

2. An interface circuit as described in claim 1, wherein the signaling data is conveyed serially on the bus and the means for receiving and directing the signaling data comprises:
   a shift register for receiving the serial data; and
   latch means, connected to the shift register, for latching said data and providing a plurality of parallel outputs to the circuit elements.

3. An interface circuit as described in claim 2, wherein the means for receiving signaling comprises:

a shift register for receiving parallel signaling inputs from the detectors on the line unit; and a multiplexer, connected to the shift register, for multiplexing the signaling from the shift register into a serial output to said bus.

4. An interface circuit as described in claim 1, wherein the means for receiving and reconfiguring provisioning data includes logic means for reconfiguring said provisioning data and shifting it to an appropriate line circuit on the line unit.

5. An interface circuit for use on a line unit in a line shelf of a digital loop carrier for interfacing with a bus connected to line shelf common equipment, said bus conveying signaling data, configuration data and provisioning data for a plurality of line units, said interface circuit comprising:

means, connected to said bus, for receiving and directing said signaling data to appropriate circuit elements within the line unit;

means, connected to detectors on the line unit, for receiving signaling therefrom and multiplexing said signaling onto said bus for transmission to the common equipment;

means, connected to said bus, for receiving and reconfiguring the provisioning data and shifting the reconfigured provisioning data to the line unit for use in a subscriber line circuit; and means, connected to said bus, for receiving and decoding said configuration data and for activating the line unit in accordance with the decoded configuration data, said means for receiving and decoding including means for receiving from the line unit a fixed line unit address, means for comparing the configuration data with the line unit address and for providing a timing strobe in response to a match between the configuration data and the line unit address, and means, receiving said timing strobe, for providing a line unit activation strobe in synchronization with the timing strobe, whereby the line unit is activated at a time determined by the configuration data.

6. An interface circuit as described in claim 5, wherein said means for providing an activation strobe further comprises means for delaying the effects of changes in the timing strobe on the timing of the activation strobe to prevent erroneous activation of the line unit resulting from transient errors in the configuration data.

7. An interface circuit as described in claim 5, wherein the configuration data determines the time the line unit is activated in a receive mode, and further includes an offset number representing a time difference to a later time when the line unit is to be activated in a transmit mode, said interface circuit outputting the activation strobe as a receive activation strobe and additionally comprises means for delaying the activation strobe by a time in accordance with the offset number and for outputting the delayed strobe as a transmit activation strobe.

8. An interface circuit as described in claim 7, wherein the means for delaying comprises a variable shift register, through which the activation strobe is passed for providing a time delay determined by the offset number.

9. An interface circuit as described in claim 5, wherein the line unit includes storage means for storing inventory information, and the configuration data may include a request to access said storage means, the interface circuit additionally comprising means for detecting an access request in the configuration data and for providing signals to access inventory information stored on the line unit.

10. An interface circuit as described in claim 1, wherein the bus is a time division multiplexed bus having frames of time slots in which the data is conveyed, the time slot configuration data conveyed in a time slot identifies a line unit to which the time slot is assigned, whereby the identified line unit is activated during the time slot in which it is identified.

11. An interface circuit as described in claim 8, wherein the variable shift register comprises:

a plurality of shift registers each having an input and an output;

means for connecting the activation strobe to a first of said shift registers;

means for providing the delayed activation strobe from the output of a last of said shift registers; and means associated with each of said shift registers for selectively connecting one of said input and output of each shift register, except for the output of the last shift register, to the input of one shift register, except for the input of the first shift register, each input of a shift register being connected to receive an input or an output from one other shift register, whereby said plurality of shift registers may be selectively connected to be bypassed or inserted into the variable shift register.

12. An interface circuit as described in claim 11, wherein said means for selectively connecting includes means for receiving the offset number as a control signal.

13. An interface circuit for use on a line unit in a line shelf of a digital loop carrier for interfacing with a bus connected to line shelf common equipment, said bus being a time division multiplexed bus having frames of time slots in which data is conveyed, said bus conveying signaling data, configuration data and provisioning data for a plurality of line units, said interface circuit comprising:

means, connected to said bus, for receiving and directing said signaling data to appropriate circuit elements within the line unit;

means connected to detectors on the line unit, for receiving signaling therefrom and multiplexing said signaling onto said bus for transmission to the common equipment;

means, connected to said bus, for receiving and reconfiguring the provisioning data and shifting the reconfigured provisioning data to the line unit for use in a subscriber line circuit; and means, connected to said bus, for receiving and decoding said configuration data and for activating the line unit in accordance with the decoded configuration data, said configuration data conveyed in a time slot identifies a line unit to which the time slot is assigned and comprises a plurality of binary coded bits forming a configuration word, said means for receiving and decoding configuration data including means associated with said line unit for fixedly providing a line unit address having a predetermined number of bits corresponding to the number of bits in the configuration word, means for receiving and latching the configuration word, comparator means for comparing the configuration word and the line unit address and in response to a match between the configuration word and the address providing a timing strobe, and means, receiving said timing strobe, for providing an activating output synchronous with said timing strobe for activating the line unit during a time slot having a predetermined relation to the time slot in which the configuration word was received.

14. An interface circuit as described in claim 13, wherein the configuration word and the line unit address each comprise five bits.

15. An interface circuit as described in claim 13, wherein said bus includes receiving lines and transmitting lines, and said configuration data in a predetermined time slot contains offset information corresponding to a number of time slots between an assigned receive time slot and an assigned transmit time slot, said interface circuit further comprising:
  means for applying the activating output to receiving circuitry in the line unit for activating the same;
  means for delaying the activating output by a number of time slots corresponding to the offset information; and
  means for applying the delayed activating output to transmit circuitry in the line unit for activating the same.

16. An interface circuit as described in claim 13, wherein said means for providing an activating output comprises:
  means for generating an activation strobe repetitively in the same time slot of each consecutive frame;
  means for outputting the activation strobe to the line unit;
  means for receiving the timing strobe from the comparator means; and
  means for comparing the timing of the activation strobe with the timing of the timing strobe from the comparator means and for initiating synchronization of the generating means with the timing strobe, when the relative timing does not correspond to the predetermined relation for a predetermined number of consecutive frames.

17. An interface circuit as described in claim 16, wherein the means for generating the activation strobe comprises:
  a counter for cyclically counting from zero to the number of time slots in a frame; and
  means responsive to a counter output for outputting said activation strobe each time the counter is at a preselected number.

18. An interface circuit as described in claim 16, additionally comprising:
  an input for receiving a disable signal; and
  means for providing the disable signal to the means for comparing, the means for comparing being responsive to the disable signal to initiate synchronization of the generating means each time a timing strobe is received, whereby an activation strobe is generated for each timing strobe without regard to the number of timing strobes received in each frame.

19. An interface circuit as described in claim 18, additionally comprising means enabled by the activation strobe to receive the timing strobe and, in the absence of the timing strobe when enabled, for disabling the means for outputting the activation strobe.

20. An interface circuit as described in claim 16, wherein the means for comparing provides a disable output when the relative timing of the timing strobe and activation strobe does not correspond to the predetermined relation for the predetermined number of consecutive frames, said interface circuit additionally comprising disable means responsive to the disable output for disabling the outputting of the activation strobe by the means for outputting.

21. An interface circuit as described in claim 18, wherein the means for comparing removes the disable output when the timing of the timing strobe and the activation strobe corresponds to the predetermined relation for a second predetermined number of consecutive frames.

22. An interface circuit as described in claim 20, wherein the disable means disables the outputting of the activation strobe if more than a predetermined number of timing strobes occur in one frame.

23. An interface circuit as described in claim 16, additionally comprising means for disabling the means for outputting the activation strobe when the timing strobe is absent for more than the predetermined number of consecutive frames.

24. An interface circuit for use on a line unit in a line shelf of a digital loop carrier for interfacing with a bus connected to line shelf common equipment, said bus conveying time slot configuration data for a plurality of line units, said interface circuit comprising means, connected to said bus, for receiving and decoding said time slot configuration data and for activating the line unit in accordance with the decoded time slot configuration data.

25. An interface circuit for use on a line unit in a line shelf of a digital loop carrier for interfacing with a bus connected to line shelf common equipment, said bus conveying configuration data for a plurality of line units, said interface circuit comprising:
  means, connected to said bus, for receiving and decoding said configuration data and for activating the line unit in accordance with the decoded configuration data, the means for receiving and decoding configuration data includes;
  means for receiving from the line unit a fixed line unit address;
  means for comparing the configuration data with the line unit address and for providing a timing strobe in response to a match between the configuration data and the line unit address; and
  means, receiving said timing strobe, for providing a line unit activation strobe in synchronization with the timing strobe, whereby the line unit is activated at a time determined by the configuration data.

26. An interface circuit as described in claim 25, wherein said means for providing an activation strobe further comprises means for delaying the effects of changes in the timing strobe on the timing of the activation strobe to prevent erroneous activation of the line unit resulting from temporary errors in the configuration data.

27. An interface circuit as described in claim 25, wherein the configuration data determines the time the line unit is activated in a receive mode, and further includes an offset number representing a time difference to a later time when the line unit is to be activated in a transmit mode, said interface circuit outputting the activation strobe as a receive activation strobe and additionally comprises means for delaying the activation strobe by a time in accordance with the offset number and for outputting the delayed strobe as a transmit activation strobe.

28. An interface circuit as described in claim 27, wherein the means for delaying comprises a variable shift register, through which the activation strobe is passed for providing a time delay determined by the offset number.

29. An interface circuit as described in claim 25, wherein the line unit includes storage means for storing inventory information, and the configuration data may include a request to access said storage means, the interface circuit additionally comprising means for detecting an access request in the configuration data and for providing signals to access inventory information stored on the line unit.

30. An interface circuit as described in claim 24, wherein the bus is a time division multiplexed bus having frames of time slots in which the data is conveyed, the time slot configuration data conveyed in a time slot identifies a line unit to which the time slot is assigned, whereby the identified line unit is activated during the time slot in which it is identified.

31. An interface circuit as described in claim 28, wherein the variable shift register comprises:
a plurality of shift registers each having an input and an output;
means for connecting the activation strobe to a first of said shift registers;
means for providing the delayed activation strobe from the output of a last of said shift registers; and
means associated with each of said shift registers for selectively connecting one of said input and output of each shift register, except for the output of the last shift register, to the input of one shift register, except for the input of the first shift register, each input of a shift register being connected to receive an input or an output from one other shift register, whereby said plurality of shift registers may be selectively connected to be bypassed or inserted into the variable shift register.

32. An interface circuit as described in claim 31, wherein said means for selectively connecting includes means for receiving the offset number as a control signal.

33. An interface circuit for use on a line unit in a line shelf of a digital loop carrier for interfacing with a bus connected to line shelf common equipment, said bus being a time division multiplexed bus having frames of time slots in which configuration data, identifying a line unit to which the time slot is assigned, is conveyed, said configuration data including a plurality of binary coded bits forming a configuration word, said interface circuit comprising means, connected to said bus, for receiving and decoding said configuration data and for activating the line unit in accordance with the decoded configuration data, said means for receiving and decoding configuration data including means associated with said line unit for fixedly providing a line unit address having a predetermined number of bits corresponding to the number of bits in the configuration word, means for receiving and latching the configuration word, comparator means for comparing the configuration word and the line unit address and in response to a match between the configuration word and the address providing a timing strobe, and means, receiving said timing strobe, for providing an activating output synchronous with said timing strobe for activating the line unit during a time slot having a predetermined relation to the time slot in which the configuration word was received.

34. An interface circuit as described in claim 33, wherein said bus includes receiving lines and transmitting lines for conveying subscriber information, and said configuration data in a predetermined time slot contains offset information corresponding to a number of time slots between an assigned receive time slot and an assigned transmit time slot, said interface circuit further comprising:
means for applying the activating output to receiving circuitry in the line unit for activating the same;
means for delaying the activating output by a number of time slots corresponding to the offset information; and
means for applying the delayed activating output to transmit circuitry in the line unit for activating the same.

35. An interface circuit as described in claim 33, wherein said means for providing an activating output comprises:
means for generating an activation strobe repetitively in the same time slot of each consecutive frame;
means for outputting the activation strobe to the line unit;
means for receiving the timing strobe from the comparator means; and
means for comparing the timing of the activation strobe with the timing of the timing strobe from the comparator means and for initiating synchronization of the generating means with the timing strobe, when the relative timing does not correspond to the predetermined relation for a predetermined number of consecutive frames.

36. An interface circuit as described in claim 35, wherein the means for generating the activation strobe comprises:
a counter for cyclically counting from zero to the number of time slots in a frame; and
means responsive to a counter output for outputting said activation strobe each time the counter is at a preselected number.

37. An interface circuit as described in claim 35, additionally comprising:
an input for receiving a disable signal; and
means for providing the disable signal to the means for comparing, the means for comparing being responsive to the disable signal to initiate synchronization of the generating means each time a timing strobe is received, whereby an activation strobe is generated for each timing strobe without regard to the number of timing strobes received in each frame.

38. An interface circuit as described in claim 37, additionally comprising means enabled by the activation strobe to receive the timing strobe and, in the absence of the timing strobe when enabled, for disabling the means for outputting the activation strobe.

39. An interface circuit as described in claim 35, wherein the means for comparing provides a disable output when the relative timing of the timing strobe and activation strobe does not correspond to the predetermined relation for the predetermined number of consecutive frames, said interface circuit additionally comprising disable means responsive to the disable output signal for disabling the outputting of the activation strobe by the means for outputting.

40. An interface circuit as described in claim 39, wherein the means for comparing removes the disable output when the timing of the timing strobe and the activation strobe corresponds to the predetermined relation for a second predetermined number of consecutive frames.

41. An interface circuit as described in claim 39, wherein the disable means disables the outputting of the activation strobe if more than a predetermined number of timing strobes occur in one frame.

42. An interface circuit as described in claim 35, additionally comprising means for disabling the means for outputting the activation strobe when the timing strobe is absent for more than the predetermined number of consecutive frames.

43. An interface circuit for use on a line unit in a line shelf of a digital loop carrier for interfacing with a bus connected to line shelf common equipment, said bus conveying configuration data for a plurality of line units, said interface circuit comprising means, connected to said bus, for receiving and decoding said configuration data and for activating the line unit in accordance with the decoded configuration data, said bus also conveys subscriber information for a subscriber connected to the line unit, said line unit when activated accesses the subscriber information on said bus.

44. An interface circuit as described in claim 43, wherein the bus is a TDM bus and the subscriber information is PCM data conveyed in time slots.

45. An interface circuit for use on a line unit in a line shelf of a digital loop carrier for interfacing with a bus connected to line shelf common equipment, said buy conveying signaling data, configuration data and provisioning data for a plurality of line units, said interface circuit comprising:
   means, connected to said bus, for receiving and directing said signaling data to appropriate circuit elements within the line unit;
   means, connected to detectors on the line unit, for receiving signaling therefrom and multiplexing said signaling onto said bus for transmission to the common equipment;
   means, connected to said bus, for receiving and reconfiguring the provisioning data and shifting the reconfigured provisioning data to the line unit for use in a subscriber line circuit; and
   means, connected to said bus, for receiving and decoding said configuration data and for activating the line unit in accordance with the decoded configuration data, said bus also conveys subscriber information for a subscriber connected to the line unit, said line unit when activated accesses the subscriber information on said bus.

46. An interface circuit as described in claim 45, wherein the bus is a TDM bus and the subscriber information is PCM data conveyed in time slots.

* * * * *

UNITED STATES PATENT AND TRADEMARK OFFICE
CERTIFICATE OF CORRECTION

PATENT NO. : 4,993,019
DATED : February 12, 1991
INVENTOR(S) : G. Cole et al

It is certified that error appears in the above-identified patent and that said Letters Patent is hereby corrected as shown below:

At column 26, line 6, please delete "18" and insert --20--.

Signed and Sealed this

Twenty-fifth Day of August, 1992

Attest:

DOUGLAS B. COMER

Attesting Officer     Acting Commissioner of Patents and Trademarks